United States Patent
Takeshita et al.

(10) Patent No.: US 10,696,060 B2
(45) Date of Patent: Jun. 30, 2020

(54) INK JET RECORDING AQUEOUS INK COMPOSITION AND IMAGE FORMING METHOD

(71) Applicant: FUJIFILM CORPORATION, Minato-ku, Tokyo (JP)

(72) Inventors: Kohei Takeshita, Kanagawa (JP); Hirohisa Hokazono, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/279,962

(22) Filed: Feb. 19, 2019

(65) Prior Publication Data

US 2019/0185691 A1  Jun. 20, 2019

Related U.S. Application Data

(63) Continuation of application No. PCT/JP2017/034818, filed on Sep. 26, 2017.

(30) Foreign Application Priority Data

Sep. 29, 2016 (JP) .................... 2016-192047

(51) Int. Cl.
*B41J 2/21* (2006.01)
*C09D 11/322* (2014.01)
(Continued)

(52) U.S. Cl.
CPC ............. *B41J 2/2107* (2013.01); *B41M 5/00* (2013.01); *C08F 2/14* (2013.01); *C08F 2/16* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005;
(Continued)

(56) References Cited

U.S. PATENT DOCUMENTS

2004/0147631 A1  7/2004 Helling
2005/0235871 A1  10/2005 Kato et al.
(Continued)

FOREIGN PATENT DOCUMENTS

DE    19651689 A1    6/1998
JP    2004-534106 A    11/2004
(Continued)

OTHER PUBLICATIONS

English language translation of the following: Office action dated Sep. 10, 2019 from the JPO in a Japanese patent application No. 2018-542611 corresponding to the instant patent application.
(Continued)

*Primary Examiner* — Manish S Shah
(74) *Attorney, Agent, or Firm* — Solaris Intellectual Property Group, PLLC

(57) ABSTRACT

Provided are an ink jet recording aqueous ink composition including: a coloring material; water; an organic solvent d-1 which is represented by Formula 1 or 2 and which has a C log P value of 0.5 to 3.5; and a resin particle including a resin containing 1 mass % to 20 mass % of a monomer unit c-1 having a C log P value more than the C log P value of the organic solvent d-1 and having an anionic group, with respect to a total mass of the resin, in which a content of the organic solvent d-1 is 0.5 mass % to 10 mass % with respect to a total mass of the ink jet recording aqueous ink composition, and an image forming method.

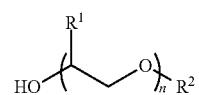

Formula 1

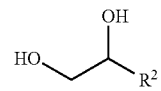

Formula 2

17 Claims, No Drawings

(51) Int. Cl.
  *B41M 5/00* (2006.01)
  *C08F 220/58* (2006.01)
  *C09D 11/30* (2014.01)
  *C08F 2/14* (2006.01)
  *C08F 2/16* (2006.01)
  *C09D 11/326* (2014.01)

(52) U.S. Cl.
  CPC ............ *C08F 220/58* (2013.01); *C09D 11/30* (2013.01); *C09D 11/322* (2013.01); *C09D 11/326* (2013.01)

(58) Field of Classification Search
  CPC ....... C09D 11/54; C09D 11/52; C09D 11/106; C09D 11/326; C09D 11/107; C09D 11/03; C09D 11/037; C09D 11/033
  See application file for complete search history.

(56) References Cited

U.S. PATENT DOCUMENTS

| | | | |
|---|---|---|---|
| 2009/0202723 A1* | 8/2009 | Ikoshi | B41M 5/0023 427/256 |
| 2010/0076150 A1 | 3/2010 | Ikoshi | |
| 2010/0077937 A1 | 4/2010 | Kawai et al. | |
| 2013/0050366 A1* | 2/2013 | Sasada | C09D 11/101 347/100 |
| 2013/0155143 A1 | 6/2013 | Ozawa | |
| 2017/0362452 A1 | 12/2017 | Yasuda et al. | |

FOREIGN PATENT DOCUMENTS

| | | |
|---|---|---|
| JP | 2005-336463 A | 12/2005 |
| JP | 2009-215535 A | 9/2009 |
| JP | 2010-70669 A | 4/2010 |
| JP | 2010-77279 A | 4/2010 |
| JP | 2011-194744 A | 10/2011 |
| JP | 2013-124335 A | 6/2013 |
| JP | 2014-152204 A | 8/2014 |
| JP | 2014-152205 A | 8/2014 |
| JP | 2016-011320 A | 1/2016 |
| JP | 2016-050267 A | 4/2016 |
| WO | 2016159054 A1 | 10/2016 |

OTHER PUBLICATIONS

International Search Report issued in International Application No. PCT/JP2017/034818 dated Oct. 31, 2017.
Written Opinion of the ISA issued in International Application No. PCT/JP2017/034818 dated Oct. 31, 2017.
Extended European Search Report dated Jul. 15, 2019, issued in corresponding EP Patent Application No. 1785616.9.
Australian Office Action dated Oct. 17, 2019, from the Australian Patent Office in an Australian patent application No. 2017335011 corresponding to the instant patent application.
English language translation of the following: Office action dated Feb. 12, 2020 from the JPO in a Japanese patent application No. 2018-542611 corresponding to the instant patent application.

* cited by examiner

INK JET RECORDING AQUEOUS INK COMPOSITION AND IMAGE FORMING METHOD

CROSS-REFERENCE TO RELATED APPLICATION

This application is a continuation application of International Application No. PCT/JP2017/034818, filed Sep. 26, 2017, the disclosure of which is incorporated herein by reference in its entirety. Further, this application claims priority from Japanese Patent Application No. 2016-192047, filed Sep. 29, 2016, the disclosure of which is incorporated herein by reference in its entirety.

BACKGROUND OF THE INVENTION

1. Field of the Invention

The present invention relates to an ink jet recording aqueous ink composition and an image forming method.

2. Description of the Related Art

As an image recording method for forming an image on a recording medium such as paper based on an image data signal, there are recording methods such as an electrophotographic method, a thermal transfer method, and an ink jet method.

In an image recording method (ink jet recording method) by an ink jet method, a printing plate is not required, and ink is jet only to an image forming portion to form an image directly on a recording medium, such that ink can be effectively used, and the running cost is low. In the ink jet recording method, a printing device is comparatively inexpensive, can be downsized, and produces less noise compared with a printing machine in the related art. As described above, the ink jet recording method has various advantages compared with other image recording methods.

JP2016-011320A discloses ink jet aqueous ink that is used in an ink jet recording method for jetting ink from an ink jet-type recording head to record an image on a non-water-absorptive recording medium, and contains at least a pigment, resin fine particles, water, and a water soluble solvent, in which an absolute value |Δζ| of a difference between a zeta potential ζpig of the pigment and a zeta potential ζres of the resin fine particle is 0 mV to 20 mV, and a glass transition point Tg of a resin constituting the resin fine particle is higher than 30° C. and lower than 80° C.

JP2016-050267A discloses a resin fine particle dispersion body containing an aqueous medium and resin fine particles dispersed in the aqueous medium by a polymer dispersant, in which the polymer dispersant is a copolymer having a constitutional unit P derived from a specific benzimidazolinone derivative, a constitutional unit A derived from a specific monomer, and a constitutional unit B derived from a specific monomer.

JP2014-152205A discloses ink jet ink containing a pigment, water, a water-soluble organic solvent, and a copolymer, in which the copolymer includes 12-methacrylamidododecanoic acid as an essential component and includes another aromatic monomer as a copolymer component, initial pH is 9 to 11, and an increase rate of viscosity in a case where pH decreases to 8.5 with respect to initial viscosity is 30% or more.

SUMMARY OF THE INVENTION

An object to be achieved by the embodiment of the present invention is to provide an ink jet recording aqueous ink composition having excellent jettability, excellent preservation stability, and excellent image quality of an obtained image, and an image forming method using the ink jet recording aqueous ink composition.

Means for achieving the above object includes the following aspects.

<1> An ink jet recording aqueous ink composition comprising: a coloring material; water; an organic solvent d-1 which is represented by Formula 1 or 2 and which has a C log P value of 0.5 to 3.5; and a resin particle including a resin containing 1 mass % to 20 mass % of a monomer unit c-1 having a C log P value more than the C log P value of the organic solvent d-1 and having an anionic group, with respect to a total mass of the resin, in which a content of the organic solvent d-1 is 0.5 mass % to 10 mass % with respect to a total mass of the ink jet recording aqueous ink composition,

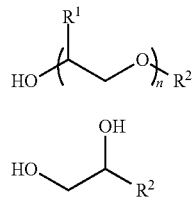

Formula 1

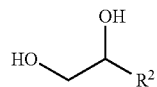

Formula 2 in Formula 1 or 2, $R^1$'s each independently represent a hydrogen atom or a methyl group, $R^2$ represents a linear or branched hydrocarbon group having 4 to 9 carbon atoms or an aryl group having 6 to 10 carbon atoms, and n represents an integer of 1 to 3.

<2> The ink jet recording aqueous ink composition according to <1>, in which the monomer unit c-1 is a monomer unit represented by Formula 3,

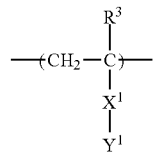

Formula 3 in Formula 3, $R^3$ represents a hydrogen atom or an alkyl group having 1 to 4 carbon atoms, $X^1$ represents a divalent linking group, $Y^1$ represents an anionic group, and in $X^1$ and $Y^1$, an atom farthest from a main chain is disposed 9 atoms to 27 atoms away from the main chain.

<3> The ink jet recording aqueous ink composition according to <1> or <2>, in which the monomer unit c-1 is a monomer unit represented by Formula 4 or 5,

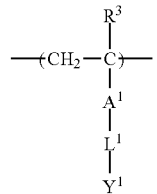

Formula 4

Formula 5

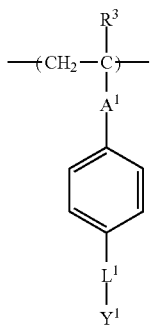

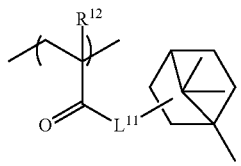

Formula D

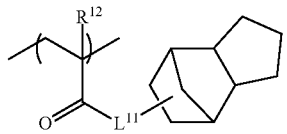

Formula E

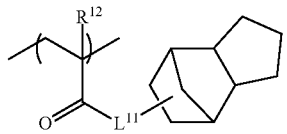

in Formula 4 or 5, $R^3$ represents a hydrogen atom or an alkyl group having 1 to 4 carbon atoms, $A^1$ represents a single bond, —C(=O)O—, or —C(=O)NR$^4$—, $R^4$ represents a hydrogen atom or an alkyl group having 1 to 4 carbon atoms, $L^1$ represents a divalent linking group having 6 to 22 carbon atoms, $Y^1$ represents an anionic group, and in $L^1$ and $Y^1$, an atom farthest from a main chain is disposed 9 atoms to 27 atoms away from the main chain.

<4> The ink jet recording aqueous ink composition according to <3>, in which $Y^1$ in Formula 4 or 5 is —C(=O)OM, —S(=O)$_2$OM, or —OP(=O)(OM)$_2$, and M is a proton, an alkali metal ion, or an ammonium ion.

<5> The ink jet recording aqueous ink composition according to <3> or <4>, in which $Y^1$ in Formula 4 or 5 is —C(=O)OM, and M is a proton, an alkali metal ion, or an ammonium ion.

<6> The ink jet recording aqueous ink composition according to any one of <3> to <5>, in which the monomer unit c-1 is a monomer unit represented by Formula 4.

<7> The ink jet recording aqueous ink composition according to any one of <1> to <6>, in which the resin further contains a monomer unit c-2 derived from an ethylenically unsaturated compound having an aromatic ring structure or an alicyclic structure.

<8> The ink jet recording aqueous ink composition according to <7>, in which the monomer unit c-2 includes a monomer unit represented by any one of Formulae A to E, Formula A

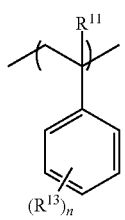

Formula B

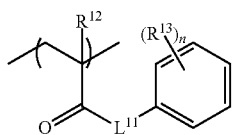

Formula C

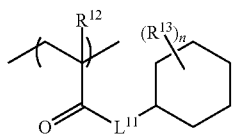

in Formulae A to E, $R^1$ and $R^{12}$ each independently represent a methyl group or a hydrogen atom, $R^{13}$'s each independently represent a linear or branched alkyl group having 1 to 10 carbon atoms, n is an integer of 0 to 5, and $L^{11}$ represents a single bond, or a linear or branched alkylene group having 1 to 18 carbon atoms which may have a ring structure, an arylene group having 6 to 18 carbon atoms, —O—, —NH—, —S—, —C(=O)—, or a divalent linking group formed by linking two or more thereof.

<9> The ink jet recording aqueous ink composition according to <8>, in which the monomer unit c-2 includes a monomer unit represented by Formula A, and a content of the monomer unit represented by Formula A is 5 mass % to 90 mass % with respect to a total mass of the resin.

<10> The ink jet recording aqueous ink composition according to <8>, in which the monomer unit c-2 includes a monomer unit represented by Formula A, and a content of the monomer unit represented by Formula A is 10 mass % to 50 mass % with respect to a total mass of the resin.

<11> The ink jet recording aqueous ink composition according to any one of <1> to <10>, in which a content of the resin particle is 1 mass % to 10 mass % with respect to the total mass of the ink jet recording aqueous ink composition.

<12> The ink jet recording aqueous ink composition according to any one of <1> to <11>, in which the C log P value of the organic solvent d-1 is 1.5 to 3.0.

<13> The ink jet recording aqueous ink composition according to any one of <1> to <12>, in which a content of the organic solvent d-1 is 1.0 mass % to 5.0 mass % with respect to the total mass of the ink jet recording aqueous ink composition.

<14> The ink jet recording aqueous ink composition according to any one of <1> to <13>, further comprising: an organic solvent d-2 which is an organic solvent other than the organic solvent d-1 and which has a vapor pressure at 20° C. of 1.0 Pa or more.

<15> The ink jet recording aqueous ink composition according to <14>, in which a total content of the organic solvent d-1 and the organic solvent d-2 is 10 mass % to 30 mass % with respect to the total mass of the ink jet recording aqueous ink composition, a content mass ratio between the organic solvent d-1 and the organic solvent d-2 (organic solvent d-1:organic solvent d-2) is 1:1 to 1:15.

<16> An image forming method comprising: a step of forming an image by applying the ink jet recording aqueous ink composition according to any one of <1> to <15> onto a recording medium by an ink jet method.

<17> The image forming method according to <16>, in which the step of forming the image is a step of forming an image by directly applying the ink jet recording aqueous ink composition according to any one of <1> to <15> onto a low water-absorptive recording medium or a non-water-absorptive recording medium.

According to the embodiment of the present invention, provided are an ink jet recording aqueous ink composition having excellent jettability, excellent preservation stability, and excellent image quality of an obtained image, and an image forming method using the ink jet recording aqueous ink composition.

DESCRIPTION OF THE PREFERRED EMBODIMENTS

According to the present specification, the numerical range expressed by using "to" means a range including numerical values described before and after "to" as a minimum value and a maximum value.

In the present specification, "(meth)acryl" represents either or both of acryl and methacryl, "(meth)acrylate" represents either or both of acrylate and methacrylate, and "(meth)acrylamide" represents either or both of acrylamide and methacrylamide.

In the present specification, "mass %" and "weight %" have the same definition, and "part by mass" and "part by weight" have the same definition. In the present specification, a combination of two or more preferred aspects is a more preferable aspect.

In the present specification, in the case where the substitution or non-substitution is not described with respect to the notation of the group in the compound represented by the formula, in a case where the above group can further have a substituent, unless otherwise specified, not only an unsubstituted group but also a group having a substituent are included. For example, in the formula, in a case where there is a description "R represents an alkyl group, an aryl group or a heterocyclic group", the description means "R represents an unsubstituted alkyl group, a substituted alkyl group, an unsubstituted aryl group, a substituted aryl group, an unsubstituted heterocyclic group, or a substituted heterocyclic group".

In the present specification, the expression "step" includes not only an independent step but also include any step as long as the intended purpose of the step is achieved even in a case where the step is not clearly distinguished from other steps.

(Ink Jet Recording Aqueous Ink Composition)

An ink jet recording aqueous ink composition (hereinafter, also simply referred to as "ink") according to the present disclosure includes: a coloring material; water; an organic solvent d-1 which is represented by Formula 1 or 2 and which has a C log P value of 0.5 to 3.5; and a resin particle including a resin containing 1 mass % to 20 mass % of a monomer unit c-1 having a C log P value more than the C log P value of the organic solvent d-1 and having an anionic group, with respect to a total mass of a resin, and a content of the organic solvent d-1 is 0.5 mass % to 10 mass % with respect to the total mass of the ink jet recording aqueous ink composition.

The present inventors diligently conducted research to find that jettability and preservation stability of the ink disclosed in JP2016-011320A are deteriorated, the image quality of an obtained image of the ink disclosed in JP2016-050267A and JP2014-152205A is deteriorated.

Therefore, the present inventors diligently conducted research to find that the ink jet recording aqueous ink composition according to the present disclosure exhibits excellent jettability, excellent preservation stability, and excellent image quality of an obtained image.

Although the detailed mechanism of an action for obtaining these effects is unknown, it is presumed as follows.

The ink jet recording aqueous ink composition according to the present disclosure the organic solvent d-1 that is represented by Formula 1 or 2 and has a C log P value of 0.5 to 3.5, and resin particles including a resin containing 1 mass % to 20 mass % of the monomer unit c-1 having a C log P value more than the C log P value of the organic solvent d-1 and having an anionic group with respect to the total mass of the resin.

A higher C log P value indicates higher hydrophobicity.

It is considered that, in a case where the organic solvent d-1 has a structure represented by Formula 1 or 2 and a C log P value of an organic solvent is 0.5 or more, a surface tension of an ink is suppressed to suppress landing interference, such that image quality of the obtained image becomes excellent.

It is considered that, in a case where a C log P value of the monomer unit c-1 included in a resin included in resin particles is more than the C log P value of the organic solvent d-1, and a C log P value of the organic solvent d-1 is 3.0 or less, the resin particles hardly swell in water or an organic solvent, such that dispersibility of the resin particle increases, and it is possible to obtain ink having excellent jettability and excellent preservation stability.

Particularly, it is considered that, on a nozzle surface of an ink jet recording device, water in the ink volatilizes, and thus a proportion of the solvent increases.

It is assumed that, the C log P value of the monomer unit c-1 included in a resin included in the resin particle according to the present disclosure is more than the C log P value of the organic solvent d-1, and thus even in a case where a proportion of the solvent in the ink increases, the swelling and filming of the resin particles by the solvent are suppressed, such that jettability becomes excellent.

Hereinafter, respective components included in the ink jet recording aqueous ink composition according to the present disclosure are disclosed.

<Coloring Material>

The ink jet recording aqueous ink composition according to the present disclosure contains a coloring material.

As the coloring material, well-known dyes, pigments, and the like can be used without particular limitation. Among these, in view of the coloring properties of the ink, it is preferable that the coloring material is almost insoluble in water or hardly soluble. Specifically, examples thereof include various kinds of pigments, dispersed dyes, oil-soluble dyes, and coloring agents for forming a J-aggregate, and pigments are more preferable.

According to the present disclosure, a water-insoluble pigment or a pigment surface-treated with a dispersant described below can be used as the coloring material.

The pigment used in the present disclosure is not particularly limited, and well-known organic or inorganic pigments in the related art can be used. Examples thereof include a polycyclic pigment such as azo lake, an azo pigment, a phthalocyanine pigment, a perylene and perinone pigment, an anthraquinone pigment, a quinacridone pigment, a dioxazine pigment, a diketopyrrolopyrrole pigment, a thioindigo pigment, an isoindolinone pigment, and a quinophthalonium pigment, dye-type lake such as basic dye-type lake and acidic dye-type lake, an organic pigment such as a nitro pigment, a nitroso pigment, aniline black, and a daylight fluorescent pigment, and an inorganic pigment such as titanium oxide, an iron oxide-based pigment, and a carbon black-based pigment. Any pigment that is not described in a color index can be used as long as it can be dispersed in a water phase. Pigments surface-treated with a surfactant, a polymer dispersant, or the like, or graft carbon and the like can be used. Among these pigments, it is particularly preferable to use an azo pigment, a phthalocyanine pigment, an anthraquinone pigment, a quinacridone pigment, or a carbon black-based pigment.

<Water>

The ink jet recording aqueous ink composition according to the present disclosure contains water.

The amount of the water is not particularly limited, and the content of the water is preferably 10 mass % to 99 mass %, more preferably 30 mass % to 80 mass %, and even more preferably 50 mass % to 70 mass % with respect to the total mass of the ink.

<Organic Solvent d-1>

The ink jet recording aqueous ink composition according to the present disclosure contains the organic solvent d-1 that is represented by Formula 1 or 2 and that has a C log P value of 0.5 to 3.5.

[Formula 1 or 2]

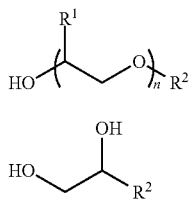

Formula 1

Formula 2

In Formula 1 or 2, $R^1$'s each independently represent a hydrogen atom or a methyl group, $R^2$ represents a linear or branched hydrocarbon group having 4 to 9 carbon atoms or an aryl group having 6 to 10 carbon atoms, and n represents an integer of 1 to 3.

In view of reducing the surface tension of the ink, in Formula 1, $R^1$ is preferably a hydrogen atom.

In view of causing the C log P value to be 0.5 to 3.5, in Formula 1, $R^2$ is preferably a linear or branched hydrocarbon group having 4 to 9 carbon atoms and more preferably a linear or branched hydrocarbon group having 6 to 8 carbon atoms.

The aryl group in $R^2$ is preferably a phenyl group or a naphthyl group and more preferably a phenyl group.

In view of reducing the surface tension of the ink, in Formula 1, n is preferably 1 or 2 and more preferably 1.

In view of image quality, the organic solvent d-1 is preferably a compound represented by Formula 1, and in view of the ink preservation stability, a compound represented by Formula 2 is preferable.

[C Log P Value]

The C log P value of the organic solvent d-1 is 0.5 to 3.5, and in view of the image quality of an obtained printed material, the C log P value is preferably 1.0 or more and more preferably 1.5 or more. In view of the ink preservation stability, the C log P value is preferably 3.0 or less and more preferably 2.7 or less.

In the present disclosure, the C log P value of the organic solvent d-1 is calculated by using ChemBioDrawUltra 13.0.

[Content of Organic Solvent d-1]

The content of the organic solvent d-1 is 0.5 mass % to 10 mass % with respect to the total mass of the ink, in view of image quality, the content thereof is preferably 1.0 mass % or more, and in view of ink preservation stability, the content thereof is preferably 5.0 mass % or less.

[Specific Examples of the Organic Solvent d-1]

Examples of the organic solvent d-1 include ethylene glycol monobutyl ether, ethylene glycol monopentyl ether, ethylene glycol monohexyl ether, ethylene glycol monoheptyl ether, ethylene glycol monooctyl ether, ethylene glycol mononyl ether, ethylene glycol mono-2-ethylhexyl ether, diethylene glycol monobutyl ether, diethylene glycol monopentyl ether, diethylene glycol monohexyl ether, diethylene glycol monoheptyl ether, diethylene glycol monooctyl ether, diethylene glycol mononyl ether, diethylene glycol mono-2-ethylhexyl ether, triethylene glycol monobutyl ether, triethylene glycol monopentyl ether, triethylene glycol monohexyl ether, triethylene glycol monoheptyl ether, triethylene glycol monooctyl ether, triethylene glycol mononyl ether, triethylene glycol mono-2-ethylhexyl ether, propylene glycol monobutyl ether, propylene glycol monopentyl ether, propylene glycol monohexyl ether, propylene glycol monoheptyl ether, propylene glycol monooctyl ether, propylene glycol mono-2-ethylhexyl ether, dipropylene glycol monobutyl ether, dipropylene glycol monopentyl ether, dipropylene glycol monohexyl ether, dipropylene glycol monoheptyl ether, dipropylene glycol monooctyl ether, dipropylene glycol mono-2-ethylhexyl ether, tripropylene glycol monobutyl ether, tripropylene glycol monopentyl ether, tripropylene glycol monohexyl ether, tripropylene glycol monoheptyl ether, tripropylene glycol monooctyl ether, tripropylene glycol mono-2-ethylhexyl ether, 1,2-hexanediol, 1,2-heptanediol, 1,2-octanediol, 1,2-nonanediol, and 1,2-decanediol, and ethylene glycol monohexyl ether, diethylene glycol monohexyl ether, diethylene glycol mono-2-ethylhexyl ether, and 1,2-octanediol are preferable.

<Resin Particle>

The ink jet recording aqueous ink composition according to the present disclosure includes resin particles including a resin containing 1 mass % to 20 mass % of the monomer unit c-1 that has a C log P value more than the C log P value of the organic solvent d-1 and has an anionic group, with respect to the total mass of the resin.

The resin particles are resin particles including a resin and may include a core agent or the like in addition to the resin, but are preferably resin particles only consisting of a resin.

Among the monomer units constituting the resin, the monomer unit having an anionic group particularly greatly contributes to the stability in the ink of the resin particles. Therefore, the C log P value of the monomer unit having an anionic group is particularly important to the dispersibility of the resin particle, and greatly influence on the jettability and the preservation stability of the ink and the image quality of an obtained image.

[Monomer Unit c-1]

—C Log P Value—

The C log P value of the monomer unit c-1 is more than the C log P value of the organic solvent d-1.

According to the present disclosure, the C log P value of the monomer unit c-1 is calculated as a C log P value of a structure in a polymer with ChemBioDrawUltra 13.0.

In the calculation, a counter ion of the anionic group is calculated as $H^+$.

In view of the jettability and the preservation stability of the ink, a difference ((C log P value of organic solvent d-1)−(C log P value of monomer unit c-1)) between the C log P value of the organic solvent d-1 and the C log P value of the monomer unit c-1 is preferably 0.2 or more, more preferably 0.8 or more, and even more preferably 1.5 or more.

—Anionic Group—

In the present disclosure, the anionic group refers to a group for forming an anion in the ink composition.

Examples of the anionic group included in the monomer unit c-1 include a sulfonic acid group, a phosphoric acid group, a phosphonic acid group, and a carboxy group, and in view of high hydrophobicity and the excellent jettability and the excellent preservation stability of the ink, a carboxy group is preferable.

The anionic group may form a salt, and may form a quaternary ammonium salt, an alkali metal salt, an alkali earth metal salt, or the like.

—Content of Monomer Unit c-1—

The content of the monomer unit c-1 is 1 mass % to 20 mass % with respect to the total mass of the resin, and in view of the jettability of the ink, the content thereof is preferably 1.5 mass % to 18 mass % and more preferably 2 mass % to 12 mass %.

The resin particle used in the present disclosure may contain only one kind of the monomer unit c-1 and may contain two or more kinds thereof. In a case where the resin particle used in the present disclosure contains two or more kinds of the monomer units c-1, the content refers to a total content of the two or more kinds of the monomer units c-1.

—Monomer Unit Represented by Formula 3—

The monomer unit c-1 is preferably a monomer unit represented by Formula 3.

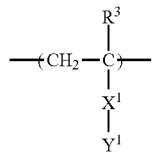

Formula 3

In Formula 3, $R^3$ represents a hydrogen atom or an alkyl group having 1 to 4 carbon atoms, $X^1$ represents a divalent linking group, $Y^1$ represents an anionic group, and in $X^1$ and $Y^1$, an atom farthest from the main chain is disposed 9 atoms to 27 atoms away from the main chain.

In Formula 3, $R^3$ is preferably a hydrogen atom or a methyl group.

In Formula 3, $X^1$ is preferably —C(=O)O—, —C(=O)NR$^4$—, an alkylene group, an arylene group, or a group represented by bonding these, and more preferably —C(=O)O—, —C(=O)NR$^4$—, an alkylene group having 6 to 22 carbon atoms, an arylene group having 6 to 20 carbon atoms, or a group represented by bonding these.

In a case where $X^1$ includes —C(=O)O— or —C(=O)NR$^4$—, it is preferable that a carbon atom to which $R^3$ in Formula 3 is bonded and carbon atom (excluding a carbon atom included in $R^4$) in —C(=O)O— or —C(=O)NR$^4$— are directly bonded to each other.

$R^4$ represents a hydrogen atom or an alkyl group having 1 to 4 carbon atoms, is preferably a hydrogen atom or a methyl group and more preferably a hydrogen atom.

In Formula 3, $Y^1$ is preferably —C(=O)OM, —S(=O)$_2$OM, or —OP(=O)(OM)$_2$ and more preferably —C(=O)OM.

M represents a proton, an alkali metal ion, or an ammonium ion. M may be bonded or dissociated.

In Formula 3, in $X^1$ and $Y^1$, an atom farthest from the main chain is preferably disposed 10 atoms to 23 atoms away from the main chain and more preferably 12 atoms to 20 atoms away from the main chain.

—Monomer Unit Represented by Formula 4 or 5—

The monomer unit c-1 is preferably a monomer unit represented by Formula 4 or 5 and more preferably a monomer unit represented by Formula 4.

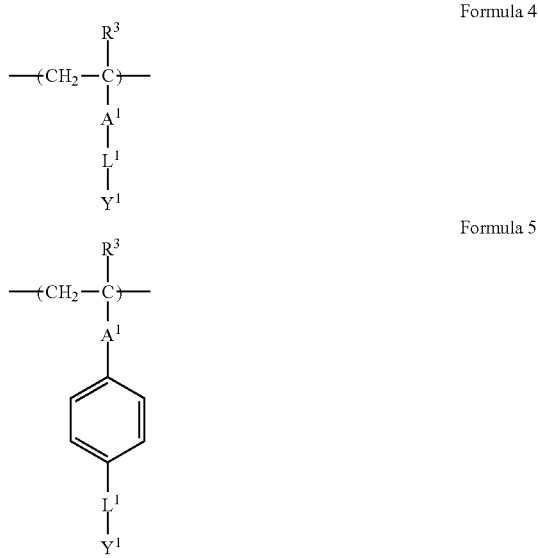

In Formula 4 or 5, $R^3$ represents a hydrogen atom or an alkyl group having 1 to 4 carbon atoms, $A^1$ represents a single bond, —C(=O)O—, or —C(=O)NR$^4$—, $R^4$ represents a hydrogen atom or an alkyl group having 1 to 4 carbon atoms, $L^1$ represents a divalent linking group having 6 to 22 carbon atoms, $Y^1$ represents an anionic group, and in $L^1$ and $Y^1$, an atom farthest from the main chain is disposed 9 atoms to 27 atoms away from the main chain.

In Formula 4 or 5, $R^3$ is the same as $R^3$ in Formula 3, and preferable aspects thereof are also the same.

In Formula 4, $A^1$ is preferably —C(=O)O— or —C(=O)NR$^4$—.

In Formula 5, $A^1$ is preferably a single bond.

In Formula 4 or 5, a bonding direction of —C(=O)O— or —C(=O)NR$^4$— is not particularly limited, but is preferably a direction in which the carbon atom in —C(=O)O— or —C(=O)NR$^4$— and the carbon atom to which $R^3$ in Formula 4 or 5 is bonded are directly bonded to each other.

$R^4$ is preferably a hydrogen atom or a methyl group and more preferably a hydrogen atom.

In Formula 4, $L^1$ preferably represents an alkylene group having 6 to 22 carbon atoms.

The alkylene group may be linear or branched, and is preferably linear in view of the jetting stability and the stability of the resin particles. $L^1$ is an alkylene group preferably having 8 to 22 carbon atoms, more preferably having 8 to 16 carbon atoms, and even more preferably having 10 to 12 carbon atoms.

In Formula 5, $L^1$ is preferably a divalent linking group having 6 to 20 carbon atoms. The divalent linking group is not particularly limited, and in view of synthesis suitability, —C(=O)NR$^4$—(CH$_2$)$_n$— or —C(=O)O—(CH$_2$)$_n$— is preferable, and —C(=O)NR$^4$—(CH$_2$)$_n$— is more preferable. Here, $R^4$ is a hydrogen atom or an alkyl group having 1 to 4 carbon atoms and is preferably a hydrogen atom. n is an integer of 5 to 18, preferably 7 to 15, and more preferably 10 to 12.

In Formula 4 or 5, $Y^1$ is preferably —C(=O)OM, —S(=O)$_2$OM, or —OP(=O)(OM)$_2$ and more preferably —C(=O)OM.

M represents a proton, an alkali metal ion, or an ammonium ion. M may be bonded or dissociated.

In Formula 4 or 5, in $L^1$ and $Y^1$, an atom farthest from the main chain is preferably disposed 10 atoms to 23 atoms away from the main chain and more preferably 12 atoms to 20 atoms away from the main chain.

Hereinafter, preferable specific examples of the monomer unit c-1 are provided, but the present invention is not limited thereto. In the following specific example, n represents the number of repetitions, and R represents a hydrogen atom or an alkyl group having 1 to 4 carbon atoms.

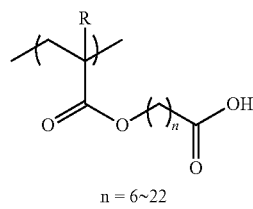
n = 6~22

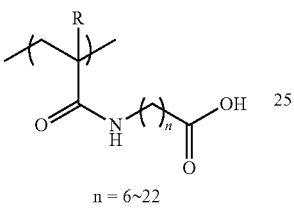
n = 6~22

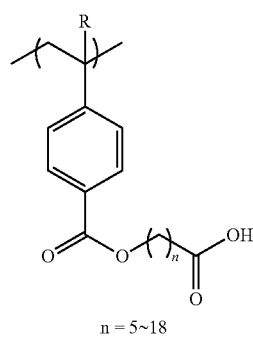
n = 5~18    n = 5~18

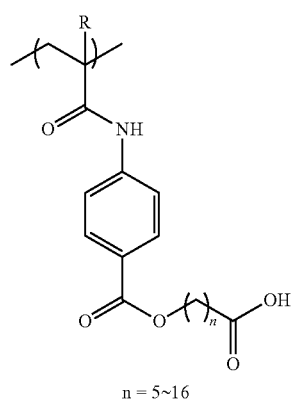
n = 5~16

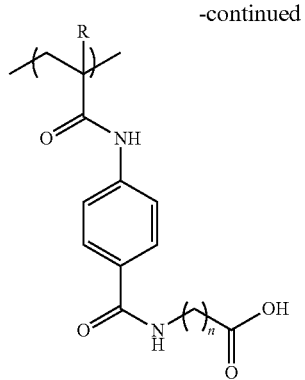
n = 5~16

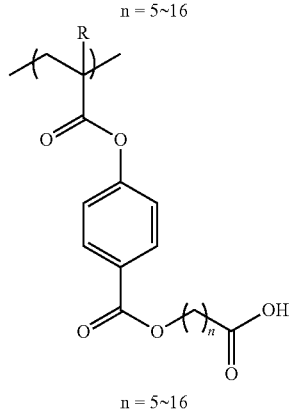
n = 5~16

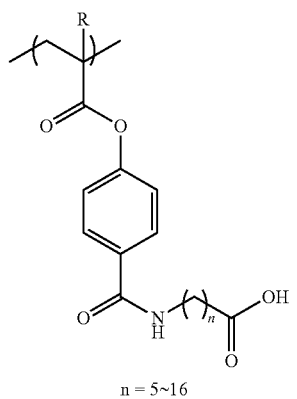
n = 5~16

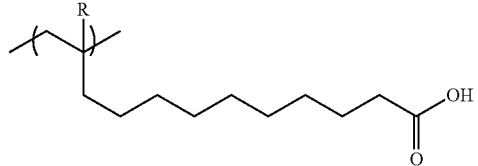

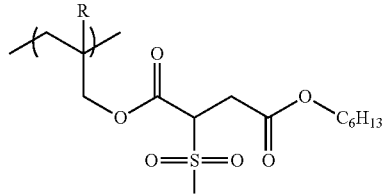

[Monomer Unit c-2]

It is preferable that the resin further contains a monomer unit c-2 (hereinafter, simply referred to as a "monomer unit c-2") derived from an ethylenically unsaturated compound having an aromatic ring structure or an alicyclic structure.

—Aromatic Ring Structure or Alicyclic Structure—

Examples of the aromatic ring structure or an alicyclic structure included in the monomer unit c-2 include a benzene ring, a naphthalene ring, an anthracene ring and an aliphatic hydrocarbon ring having 5 to 20 carbon atoms, and a benzene ring and an aliphatic hydrocarbon ring having 6 to 10 carbon atoms are preferable.

These aromatic ring structures or alicyclic structures may have a substituent in a ring structure.

—Ethylenically Unsaturated Compound Having Aromatic Ring Structure or Alicyclic Structure—

The ethylenically unsaturated compound having an aromatic ring structure or an alicyclic structure which is a monomer constituting the monomer unit c-2 is preferably an ethylenically unsaturated compound having an ethylenically unsaturated group at a compound terminal, more preferably styrene or a (meth)acrylate compound, or a (meth)acrylamide compound which may have a substituent, and even more preferably styrene or a (meth)acrylate compound which may have a substituent.

Examples of the ethylenically unsaturated compound include styrene, benzyl (meth)acrylate, isobornyl (meth) acrylate, cyclohexyl (meth)acrylate, and dicyclopentanyl (meth)acrylate.

—Content of Monomer Unit c-2—

In view of jettability of the ink, the content of the monomer unit c-2 is preferably 5 mass % to 90 mass % and more preferably 10 mass % to 50 mass % with respect to the total mass of the resin.

The resin particle used in the present disclosure may contain only one kind of the monomer unit c-2 or may contain two or more kinds thereof. In a case where the resin particle used in the present disclosure contains two or more kinds of the monomer units c-2, the content refers to a total content of the two or more kinds of the monomer units c-2.

—Monomer Unit Represented by One of Formulae A to E—

In view of the rub resistance of an obtained image, the monomer unit c-2 preferably includes a monomer unit represented by any one of Formulae A to E, and in view of the jettability of the ink, the monomer unit c-2 more preferably includes a monomer unit represented by Formula A.

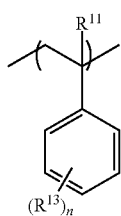

Formula A

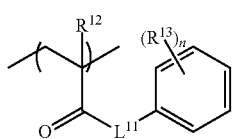

Formula B

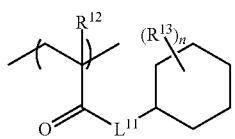

Formula C

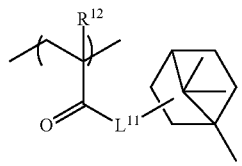

Formula D

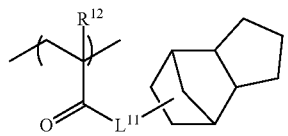

Formula E

In Formulae A to E, $R^1$ and $R^{12}$ each independently represent a methyl group or a hydrogen atom, $R^{13}$'s each independently represent a linear or branched alkyl group having 1 to 10 carbon atoms, n is an integer of 0 to 5, $L^1$ represents a single bond, or a linear or branched alkylene group having 1 to 18 carbon atoms which may have a ring structure, an arylene group having 6 to 18 carbon atoms, —O—, —NH—, —S—, —C(=O)—, or a divalent linking group formed by linking two or more thereof.

In Formula A, $R^{11}$ is preferably a hydrogen atom.

In Formulae B to E, $R^{12}$ is preferably a methyl group.

In Formulae A to C, $R^{13}$ each independently are preferably a linear or branched alkyl group having 1 to 4 carbon atoms and more preferably a methyl group or an ethyl group.

In Formulae A to C, n is preferably an integer of 0 to 2, more preferably 0 or 1, and even more preferably 0.

In Formula B, $L^{11}$ is preferably a divalent linking group including at least —O— or —NH— at a bonding site to a carbon atom bonded to a carbonyl group described in Formula B, more preferably a divalent linking group including at least —O— or —NH— at a bonding site to a carbon atom bonded to the carbonyl group and including a linear or branched alkylene group that has 1 to 18 carbon atoms and may have a ring structure, even more preferably —OCH$_2$— or —NHCH$_2$—, and particularly preferably —OCH$_2$—.

In Formulae C to E, $L^{11}$ is preferably a divalent linking group at least including —O— or —NH— to a bonding site to a carbon atom bonded to a carbonyl group described in Formulae C to E, more preferably —O— or —NH—, and even more preferably —O—.

The monomer unit represented by Formula A is preferably a monomer unit derived from styrene.

The monomer unit represented by Formula B is preferably a monomer unit derived from benzyl (meth)acrylate.

The monomer unit represented by Formula C is preferably a monomer unit derived from cyclohexyl (meth)acrylate.

The monomer unit represented by Formula D is preferably a monomer unit derived from isobornyl (meth)acrylate.

The monomer unit represented by Formula E is preferably a monomer unit derived from dicyclopentanyl (meth)acrylate.

—Content of Monomer Unit Represented by Formula A—

In view of rub resistance of the obtained image, the content of the monomer unit represented by Formula A is 1 mass % to 20 mass % with respect to the total mass of the resin, and in view of jettability of the ink, the content thereof is preferably 5 mass % to 90 mass % and more preferably 10 mass % to 50 mass %.

[Another Monomer Unit c-3]

The resin may contain another monomer unit c-3 (hereinafter, simply referred to as a "monomer unit c-3") in addition to the monomer units c-1 and c-2.

The monomer unit c-3 is not particularly limited, but is preferably a monomer unit derived from a (meth)acrylamide compound or a (meth)acrylate compound and more preferably a monomer unit derived from a (meth)acrylate compound.

It is preferable that the monomer unit c-3 does not include an anionic group.

The monomer unit c-3 is preferably an alkyl (meth)acrylate compound in which the alkyl group has 1 to 10 carbon atoms. The alkyl group may be linear or branched and may have a cyclic structure.

—Content of Monomer Unit c-3—

In view of the jettability and the rub resistance, the content of the monomer unit c-3 is preferably 0 mass % to 90 mass % and more preferably 0 mass % to 70 mass % with respect to the total mass of the resin.

The resin particle used in the present disclosure may contain only one kind of the monomer unit c-3 and may contain two or more kinds thereof. In a case where the resin particle used in the present disclosure contains two or more kinds of the monomer units c-3, the content thereof refers to a total content of the two or more kinds of the monomer units c-3.

[Characteristics of Resin]

—Amount of Anionic Group—

In view of dispersibility of the resin particle, the content of the anionic group in the resin is preferably 0.05 mmol/g to 0.7 mmol/g and more preferably 0.1 mmol/g to 0.4 mmol/g with respect to a total mass of the resin.

—Weight-Average Molecular Weight of Resin—

The weight-average molecular weight (Mw) of the resin is preferably 10,000 to 1,000,000 and more preferably 20,000 to 500,000.

In the present disclosure, the weight-average molecular weight is measured by gel permeation chromatography (GPC). Three of the GPCs were connected in series using HLC-8220GPC (manufactured by Tosoh Corporation), using TSKgeL SuperHZM-H, TSKgeL SuperHZ4000, and TSKgel SuperHZ2000 (all trade names manufactured by Tosoh Corporation) as columns, and using THF (tetrahydrofuran) as an eluent. As conditions, the sample concentration is 0.45 mass %, the flow rate is 0.35 ml/min, the sample injection amount is 10 µl, the measurement temperature is 40° C., and the differential refractive index detector is used. The calibration curve was obtained using eight samples of "Standard sample TSK standard, polystyrene" manufactured by Tosoh Corporation: "F-40", "F-20", "F-4", "F-1", "A-5000", "A-2500", "A-1000", and "n-propylbenzene".

—Glass Transition Temperature of Resin—

In view of rub resistance of the obtained image, the glass transition temperature (Tg) of the resin is preferably 30° C. to 120° C., more preferably 50° C. to 100° C., and even more preferably 70° C. to 100° C.

As the glass transition temperature (Tg), measurement Tg that can be obtained by actual measurement is applied.

Specifically, the measurement Tg means a value measured under ordinary measurement conditions using a differential scanning calorimeter (DSC) EXSTAR6220 manufactured by SII Nano Technology Inc. Here, in a case where the measurement is difficult due to decomposition of a material or the like, the calculation Tg calculated by the following calculation expression is applied. The calculation Tg is a value calculated by the following expression (1).

$$1/Tg = \Sigma(Xi/Tgi) \tag{1}$$

Here, it is assumed that n kinds of monomer components from i=1 to n are copolymerized as a polymer to be calculated. Xi is the mass fraction ($\Sigma Xi=1$) of the i-th monomer, and Tgi is the glass transition temperature (absolute temperature) of the homopolymer of the i-th monomer. Here, $\Sigma$ is the sum of from i=1 to n. The value of the homopolymer glass transition temperature (Tgi) of each monomer is a value of Polymer Handbook (3rd Edition) (written by J. Brandrup, E. H. Immergut (Wiley-Interscience, 1989)).

[Particle Diameter of Resin Particle]

In view of jettability of the ink, the volume average particle diameter of the resin particles used in the present disclosure is preferably 1 nm to 200 nm, more preferably 5 nm to 100 nm, and most preferably 10 nm to 50 nm.

The volume average particle diameter can be measured by a particle size distribution determination device using light scattering (for example, Microtrac UPA (registered trademark) EX 150 manufactured by Nikkiso Co., Ltd.).

[Method of Manufacturing Resin Particles]

The resin particle is not particularly limited, but is preferably prepared by an emulsion polymerization method. The emulsion polymerization method is a method of preparing resin particles by polymerizing an emulsion prepared by adding a monomer, a polymerization initiator, an emulsifier, if necessary, a chain transfer agent, and the like in an aqueous medium (for example, water). In a case where the emulsion polymerization method is applied to the preparation of the resin particle, the monomer for forming the monomer unit c-1 can also function as an emulsifier. Accordingly, an emulsifier in addition to the monomer for forming the monomer unit c-1 is not separately required to be mixed, but an existing emulsifier can be separately added as long as the emulsifier is added in a range of not deteriorating the jettability and the image quality in a case where the ink is prepared.

—Polymerization Initiator—

The polymerization initiator is not particularly limited, and inorganic persulfate (for example, potassium persulfate, sodium persulfate, and ammonium persulfate), an azo-based initiator (for example, 2,2'-azobis(2-amidinopropane) dihydrochloride, and 2,2'-azobis[2-methyl-N-(2-hydroxyethyl)-propionamide]), organic peroxide (for example, t-butyl peroxypivalate and t-butyl hydroperoxide), and the like, or a salt thereof can be used. These can be used singly or two or more kinds thereof may be used in combination.

Among these, it is preferable to use an azo-based initiator or organic peroxide.

The use amount of the polymerization initiator used in the present disclosure is preferably 0.01 mass % to 2 mass % and more preferably 0.2 mass % to 1 mass % with respect to the total mass of the monomer components.

—Chain Transfer Agent—

As the chain transfer agent, well-known compounds such as carbon tetrahalide, dimers of styrenes, dimers of (meth)acrylic esters, mercaptans, and sulfides can be used.

Among these, dimers and mercaptans of styrenes described in JP1993-017510A (JP-H05-017510A) can be suitably used.

The resin particles used in the present disclosure is preferably dispersed in the ink according to the present disclosure.

The resin particle used in the present disclosure is preferably a self-dispersing resin particle.

Here, the self-dispersing resin particle refers to a resin particle including a water-insoluble resin which can be in dispersion state in an aqueous medium by a functional group (particularly, a hydrophilic group such as an acidic group or a salt thereof) possessed by the resin itself in a case of being in a dispersion state by a phase-transfer emulsification method in the absence of a surfactant.

Here, the dispersion state includes both states of an emulsion state (emulsion) in which a water-insoluble resin is dispersed in a liquid state in an aqueous medium and a dispersion state (suspension) in which a water-insoluble resin is dispersed in a solid state in an aqueous medium.

The expression "water-insoluble" means that an amount of dissolution in 100 parts by mass of water at 25° C. is 5.0 parts by mass or less.

The resin particle used in the present disclosure does not function as a dispersant of a pigment, and thus do not contain a pigment inside the particles.

[Content of Resin Particle]

In view of the preservation stability of the ink and the rub resistance of the obtained image, the content of the resin particle used in the present disclosure is preferably 1 mass % to 20 mass %, more preferably 1 mass % to 10 mass %, and even more preferably 2 mass % to 10 mass % with respect to the total mass of the ink.

[Specific Example of Resin Included in Resin Particle]

The specific examples of the resin included in the resin particles used in the present disclosure are provided below, but the present disclosure is not limited thereto. The resin particle used in the present disclosure is preferably a resin particle including these resins. In the following specific examples, n represents the number of repetitions, the description of mass % means the content mass % of each monomer unit, and a numerical value in the section of Mw represents a weight-average molecular weight.

TABLE 1

| | Monomer unit c-1 | Monomer unit c-2 | Monomer unit c-3 | Mw (ten thousand) | Tg (° C.) |
|---|---|---|---|---|---|
| C-1 | (structure with n=10, amide, COOH) 7 mass % | (styrene) 30 mass % | (methyl acrylate) 63 mass % | 25 | 96 |
| C-2 | (structure with n=7, COOH) 7 mass % | (styrene) 30 mass % | (methyl acrylate) 63 mass % | 26 | 94 |
| C-3 | (structure with n=9, benzamide, COOH) 7 mass % | (styrene) 30 mass % | (methyl acrylate) 63 mass % | 28 | 96 |
| C-4 | (structure with $C_6H_{13}$, sulfonate) 7 mass % | (styrene) 30 mass % | (methyl acrylate) 63 mass % | 22 | 95 |

TABLE 1-continued
| | Monomer unit c-1 | Monomer unit c-2 | Monomer unit c-3 | Mw (ten thousand) | Tg (° C.) |
|---|---|---|---|---|---|
| C-5 | 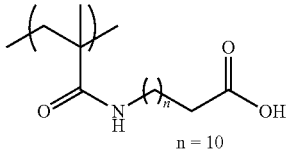 1 mass % | 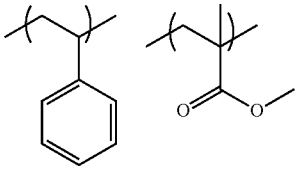 30 mass % | 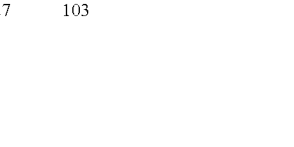 69 mass % | 27 | 103 |
| C-6 | 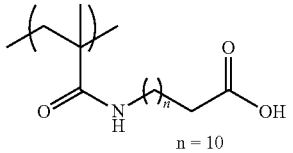 3 mass % | 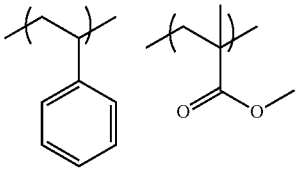 30 mass % | 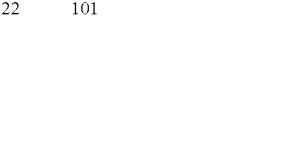 67 mass % | 22 | 101 |
| C-7 | 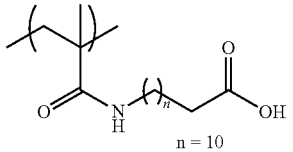 10 mass % | 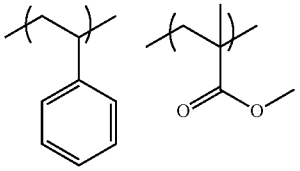 30 mass % |  60 mass % | 21 | 94 |
| C-8 | 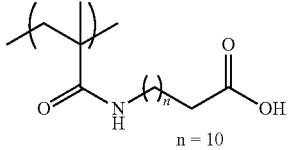 15 mass % | 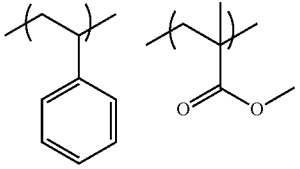 30 mass % |  55 mass % | 24 | 89 |
| C-9 | 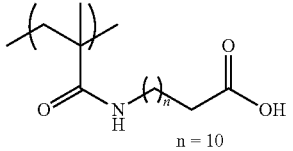 20 mass % | 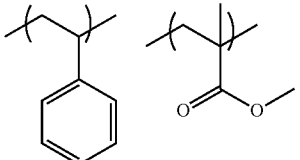 30 mass % |  50 mass % | 28 | 84 |
TABLE 2
| | Monomer unit c-1 | Monomer unit c-2 | Monomer unit c-3 | Mw (ten thousand) | Tg (° C.) |
|---|---|---|---|---|---|
| C-10 | 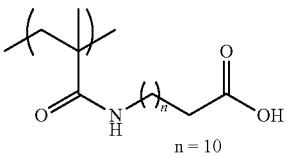 7 mass % | 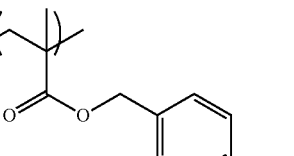 30 mass % | 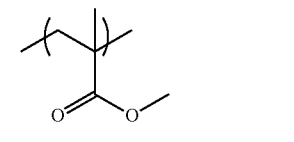 63 mass % | 30 | 83 |

TABLE 2-continued

| | Monomer unit c-1 | Monomer unit c-2 | Monomer unit c-3 | Mw (ten thousand) | Tg (° C.) |
|---|---|---|---|---|---|
| C-11 | -NHC(O)-(CH$_2$)$_n$-COOH, n=10, 7 mass % | -C(O)O-cyclohexyl, 30 mass % | -C(O)O-CH$_3$, 63 mass % | 22 | 78 |
| C-12 | -NHC(O)-(CH$_2$)$_n$-COOH, n=10, 7 mass % | -C(O)O-isobornyl, 30 mass % | -C(O)O-CH$_3$, 63 mass % | 25 | 115 |
| C-13 | -NHC(O)-(CH$_2$)$_n$-COOH, n=10, 7 mass % | -C(O)O-dicyclopentanyl, 30 mass % | -C(O)O-CH$_3$, 63 mass % | 20 | 118 |
| C-14 | -NHC(O)-(CH$_2$)$_n$-COOH, n=10, 7 mass % | -C$_6$H$_5$, 5 mass % | -C(O)O-CH$_3$, 88 mass % | 28 | 98 |
| C-15 | -NHC(O)-(CH$_2$)$_n$-COOH, n=10, 7 mass % | -C$_6$H$_5$, 10 mass % | -C(O)O-CH$_3$, 83 mass % | 20 | 98 |
| C-16 | -NHC(O)-(CH$_2$)$_n$-COOH, n=10, 7 mass % | -C$_6$H$_5$, 50 mass % | -C(O)O-CH$_3$, 43 mass % | 15 | 95 |
| C-17 | -NHC(O)-(CH$_2$)$_n$-COOH, n=10, 7 mass % | -C$_6$H$_5$, 90 mass % | -C(O)O-CH$_3$, 3 mass % | 18 | 93 |

TABLE 2-continued

| | Monomer unit c-1 | Monomer unit c-2 | Monomer unit c-3 | Mw (ten thousand) | Tg (° C.) |
|---|---|---|---|---|---|
| C-18 | (acrylamide with -NH-(CH$_2$)$_n$-COOH, n = 10) 7 mass % | (styrene) 30 mass % | (2-ethylhexyl acrylate) 63 mass % | 23 | 24 |

TABLE 3

| | Monomer unit c-1 | Monomer unit c-2 | Monomer unit c-3 | Mw (ten thousand) | Tg (° C.) |
|---|---|---|---|---|---|
| C-19 | (acrylamide with -NH-(CH$_2$)$_n$-COOH, n = 10) 7 mass % | (styrene) 46 mass % | (2-ethylhexyl acrylate) 47 mass % | 25 | 42 |
| C-20 | (acrylamide with -NH-(CH$_2$)$_n$-COOH, n = 10) 7 mass % | (styrene) 63 mass % | (2-ethylhexyl acrylate) 30 mass % | 28 | 60 |
| C-21 | (acrylamide with -NH-(CH$_2$)$_n$-COOH, n = 10) 7 mass % | (styrene) 36 mass % | (butyl acrylate) 63 mass % | 15 | −4 |
| C-22 | (acrylamide with -NH-(CH$_2$)$_n$-COOH, n = 10) 15 mass % | (styrene) 85 mass % | — | 23 | 86 |

<Organic Solvent d-2>

In view of drying properties of the ink, the ink according to the present disclosure preferably includes an organic solvent d-2 (hereinafter, simply referred to as an "organic solvent d-2") in which the vapor pressure at 20° C. is 1.0 Pa or more and which is an organic solvent other than the organic solvent d-1.

The organic solvent d-2 is an organic solvent other than the organic solvent d-1.

According to the present disclosure, even in a case where the vapor pressure at 20° C. is 1.0 Pa or more, the organic solvent corresponding to the organic solvent d-1 does not correspond to the organic solvent d-2.

[Vapor Pressure at 20° C.]

The vapor pressure of the organic solvent d-2 at 20° C. is preferably 1.0 Pa or more, more preferably 2.0 Pa or more, and even more preferably 10 Pa or more.

The vapor pressure of the organic solvent d-2 at 20° C. is measured by the well-known method, but the vapor pressure can be obtained by a stationary method. The vapor pressure measurement by the stationary method is a method of directly or indirectly measuring the pressure of the vapor in equilibrium with the solid of the sample and is measured according to the OECD guidelines 104.

[C Log P Value]

In view of jettability, the C log P value of the organic solvent d-2 is preferably smaller than the C log P value of the monomer unit c-1.

The C log P value of the organic solvent d-2 is preferably −3.0 to 0 and more preferably −2.0 to 0.

The C log P value of the organic solvent d-2 is calculated by the above method.

[Content of the Organic Solvent d-2]

In view of the jettability and the drying properties of the ink, the content of the organic solvent d-2 is preferably 1 mass % to 30 mass %, more preferably 5 mass % to 25 mass %, and even more preferably 10 mass % to 20 mass % with respect to a total mass of the ink.

In view of the jettability and the drying properties of the ink, the total content of the organic solvent d-1 and the organic solvent d-2 is preferably 6 mass % to 40 mass %, more preferably 10 mass % to 30 mass %, and even more preferably 15 mass % to 25 mass % with respect to the total mass of the ink.

In view of the jettability and the drying properties of the ink, the content mass ratio of the organic solvent d-1 and the organic solvent d-2 (organic solvent d-1:organic solvent d-2) is preferably 1:1 to 1:15, more preferably 1:2 to 1:10, and even more preferably 1:3 to 1:8.

[Specific Example of Organic Solvent d-2]

Examples of the organic solvent d-2 include diethylene glycol (vapor pressure at 20° C.: 2.7 Pa, C log P value: −1.30), dipropylene glycol (vapor pressure at 20° C.:1.3 Pa, C log P value: −0.69), propylene glycol (vapor pressure at 20° C.: 10.6 Pa, C log P value: −1.06), and 1,2-butanediol (vapor pressure at 20° C.: 2.7 Pa, C log P value: −0.53), and in view of drying properties of the ink, propylene glycol is preferable.

<Other Components>

The ink jet recording aqueous ink composition according to the present disclosure may contain other components.

Examples of the other components include a dispersant or a surfactant.

[Dispersant]

In a case where the ink jet recording aqueous ink composition according to the present disclosure contains a pigment as a coloring material, it is preferable that the pigment is dispersed by the dispersant.

For example, it is preferable that, in a case of preparing the ink, a pigment dispersion liquid in which the pigment is dispersed in water or an aqueous medium including water and an organic solvent by the dispersant is prepared in advance, and this is used as a raw material of the ink.

The dispersant of the pigment may be a polymer dispersant or a low-molecular-weight surfactant-type dispersant. A polymer dispersant may be any one of a water soluble dispersant or a water insoluble dispersant.

With respect to the low-molecular-weight surfactant-type dispersant, for example, well-known low-molecular-weight surfactant-type dispersants disclosed in paragraphs 0047 to 0052 of JP2011-178029A can be used.

Among the polymer dispersants, examples of the water soluble dispersant include a hydrophilic polymer compound. Examples of the natural hydrophilic polymer compound include a vegetable polymer such as gum arabic, tragacanth gum, guar gum, karaya gum, locust bean gum, arabinogalactone, pectin, and quince seed starch, a seaweed-based polymer such as alginic acid, carrageenan, and agar, an animal-based polymer such as gelatin, casein, albumin, and collagen, and a microbial polymer such as xanthan gum and dextran.

Examples of the hydrophilic polymer compounds obtained by modifying a natural product with a raw material include a cellulosic polymer such as methyl cellulose, ethyl cellulose, hydroxyethyl cellulose, hydroxypropyl cellulose, and carboxymethyl cellulose, a starch-based polymer such as sodium starch glycolate and sodium starch phosphate ester, and a seaweed-based polymer such as sodium alginate and propylene glycol alginate.

Examples of the synthetic hydrophilic polymer compound include a vinyl-based polymer such as polyvinyl alcohol, polyvinyl pyrrolidone, and polyvinyl methyl ether, an acrylic resin such as uncrosslinked polyacrylamide, polyacrylic acid or an alkali metal salt thereof, and a water soluble styrene acrylic resin, a water soluble styrene maleic acid resin, a water soluble vinyl naphthalene acrylic resin, a water soluble vinyl naphthalene maleic acid resin, polyvinyl pyrrolidone, polyvinyl alcohol, an alkali metal salt of a 0-naphthalenesulfonic acid formalin condensate, a polymer compound having a salt of a cationic functional group such as quaternary ammonium or an amino group in a side chain, and a natural polymer compound such as shellac.

Among these, a water soluble dispersant into which a carboxyl group is introduced, such as a homopolymer of acrylic acid, methacrylic acid, and styrene acrylic acid, or a copolymer with a monomer having another hydrophilic group is preferable as a hydrophilic polymer compound.

Among the polymer dispersant, as the water insoluble dispersant, a polymer having both of the hydrophobic part and a hydrophilic part can be used. Examples thereof include a styrene-(meth)acrylic acid copolymer, a styrene-(meth) acrylic acid-(meth)acrylic acid ester copolymer, a (meth) acrylic acid ester-(meth)acrylic acid copolymer, a polyethylene glycol (meth)acrylate-(meth)acrylic acid copolymer, a vinyl acetate-maleic acid copolymer, and a styrene-maleic acid copolymer.

The weight-average molecular weight of the polymer dispersant is preferably 3,000 to 100,000, more preferably 5,000 to 50,000, even more preferably 5,000 to 40,000, and particularly preferably 10,000 to 40,000.

The mixing mass ratio (p:s) of the pigment (p) and the dispersant (s) is preferably in the range of 1:0.06 to 1:3, more preferably in the range of 1:0.125 to 1:2, and even more preferably in the range of 1:0.125 to 1:1.5.

[Surfactant]

If necessary, the ink jet recording aqueous ink composition according to the present disclosure may include a surfactant. The surfactant is used as a surface tension adjuster.

As the surface tension adjuster, a compound having a structure having both a hydrophilic part and a hydrophobic part in a molecule and the like can be effectively used, and all of an anionic surfactant, a cationic surfactant, an amphoteric surfactant, a nonionic surfactant, a betaine-based surfactant can be used. The dispersant (polymer dispersant) may be used as the surfactant.

In the present disclosure, in view of suppressing ink droplet deposition interference, a nonionic surfactant is preferable, and among these, an acetylene glycol derivative is more preferable.

In a case where the surfactant (surface tension adjuster) is contained in the ink composition, in view of improving the jetting of the ink composition by an ink jet method, the surfactant preferably is contained in an amount in the range in which the surface tension of the ink composition can be adjusted to 20 mN/m to 60 mN/m, and in view of the surface tension, 20 mN/m to 45 mN/m is more preferable, and 25 mN/m to 40 mN/m is even more preferable.

The surface tension of the ink is measured at a temperature of 25° C. by using Automatic Surface Tensiometer CBVP-Z (manufactured by Kyowa Interface Science Co., Ltd.).

A specific amount of the surfactant in the ink composition is not particularly limited, as long as the range in which the surface tension is achieved is preferable, and the amount thereof is preferably 0.1 mass % or more, more preferably 0.1 mass % to 10 mass %, and even more preferably 0.1 mass % to 3 mass %.

[Other Components]

The ink jet recording aqueous ink composition according to the present disclosure may further contain well-known additives such as an ultraviolet absorbing agent, an antifading agent, an antibacterial agent, a pH adjuster, a rust inhibitor, an antioxidant, an emulsification stabilizer, a preservative, an antifoaming agent, a viscosity adjuster, a dispersion stabilizer, a chelating agent, and a solid wetting agent.

The well-known additives can be used without particular limitation as long as the additives are well-known additives in the field of aqueous ink.

<Physical Properties of Ink>

[Viscosity]

The viscosity of the ink according to the present disclosure at 30° C. is preferably 1.2 mPa·s to 15.0 mPa·s, more preferably 2.0 mPa·s to 13.0 mPa·s, and even more preferably 2.5 mPa·s to 10.0 mPa·s.

The viscosity of the ink is measured at a temperature of 30° C. by using VISCOMETER TV-22 (manufactured by TOKI SANGYO CO. LTD.).

[pH]

In view of the preservation stability of the ink, with respect to the pH of the ink according to the present disclosure, pH at 25° C. is preferably 6.0 to 11.0, more preferably 7.0 to 10.0, and even more preferably 7.0 to 9.0.

pH of the ink is measured by using pH meter WM-50EG (manufactured by DKK-TOA Corporation) under the environment of 25° C.

(Image Forming Method)

The image forming method according to the present disclosure includes a step of applying the ink jet recording aqueous ink composition according to the present disclosure onto a recording medium by an ink jet method to form an image.

If necessary, the image forming method according to the present disclosure may further have another step such as a step (hereinafter, referred to as an "ink drying step") of drying and removing water or an organic solvent such as the organic solvent d-1 in the ink composition applied to the recording medium or a step (hereinafter, referred to as a "thermal fixing step") melting and fixing the resin particle included in the ink.

The step of forming the image is preferably a step of directly applying the ink jet recording aqueous ink composition according to the present disclosure onto a low water-absorptive recording medium or a non-water-absorptive recording medium to form an image.

The expression "directly applying the ink onto a low water-absorptive recording medium or a non-water-absorptive recording medium" means that the applied ink and the low water-absorptive recording medium or the non-water-absorptive recording medium are in direct contact with each other.

For example, in the case where a well-known treatment liquid in the field of an image forming method by aqueous ink for the purpose of aggregating the components such as resin particles included in the ink is applied in advance, the ink and the low water-absorptive recording medium or the non-water-absorptive recording medium are not in direct contact with each other.

Examples of the well-known treatment liquid include treatment liquids disclosed in JP2012-040778A.

After the ink applying step, it is preferable that, in the image forming method according to the present disclosure, the well-known treatment liquids are not applied.

That is, the image forming method according to the present disclosure preferably does not include a step of applying the well-known treatment liquid.

In the ink jet method using the aqueous ink in the related art, particularly, the low water-absorptive recording medium or the non-water-absorptive recording medium is used as the recording medium, for example, there is known a method of using a precoat liquid or a topcoat liquid, aggregating components in the ink jetted onto the recording medium, and suppressing spreading of the ink to improve the image quality.

However, in a case where the ink according to the present disclosure is used, the image quality of the obtained image is excellent, and thus even in a case where an image is formed on the low water-absorptive recording medium or the non-water-absorptive recording medium without using the precoat liquid or the topcoat liquid, it is possible to obtain an image having excellent image quality.

<Ink Applying Step>

[Recording Medium]

The recording medium used as the image forming method according to the present disclosure is not particularly limited, and for example, so-called coated paper used in general offset printing can be used. The coated paper is one in which a coating layer is provided by coating a surface of high-quality paper, alkaline paper, or the like which is not subjected to a surface treatment with a coating material using cellulose as a main component.

For coated paper, one that is generally on the market can be obtained to be used. For example, coated paper for general printing can be used, and specifically, examples thereof include coated paper (A2, B2) such as "OK TOP-COAT+" manufactured by Oji Paper Co., Ltd. and "AURORA COAT" and "ULITE" manufactured by Nippon Paper Industries Co., Ltd., and art paper (A1) such as "TOKUSHU ART" manufactured by Mitsubishi Paper Mills Ltd.

The low water-absorptive recording medium or the non-water-absorptive recording medium by the image forming method according to the present disclosure can be used.

According to the present disclosure, with respect to the low water-absorptive recording medium, a water absorption coefficient Ka is 0.05 mL/m$^2$·ms$^{1/2}$ to 0.5 mL/m$^2$ ms$^{1/2}$, preferably 0.1 mL/m$^2$ ms$^{1/2}$ to 0.4 mL/m$^2$·ms$^{1/2}$, and more preferably 0.2 mL/m$^2$ ms$^{1/2}$ to 0.3 mL/m$^2$·ms$^{1/2}$ With respect to the non-water-absorptive recording medium, a water absorption coefficient Ka is 0.05 mL/m$^2$·ms$^{1/2}$ or less.

The water absorption coefficient Ka is the same as that disclosed in the JAPAN TAPPI paper pulp test method No. 51: 2000 (Issued: Pulp and Paper Technical Association), and specifically, the absorption coefficient Ka is calculated from the difference in the transfer amount of water at a contact time of 100 ms and a contact time of 900 ms using an automatic scanning liquid absorptometer KM500Win (manufactured by Kumagai Riki Kogyo Co., Ltd.).

As the non-absorptive recording medium, a resin substrate is preferable. Examples of the resin substrate include a substrate obtained by forming a thermoplastic resin into a sheet shape.

The resin substrate preferably includes polypropylene, polyethylene terephthalate, nylon, polyethylene, or polyimide.

The resin substrate may be a transparent resin substrate, a colored resin substrate, or at least a part thereof may be subjected to a metal vapor deposition treatment or the like.

The shape of the resin substrate according to the present disclosure is not particularly limited, but a sheet-shaped resin substrate is preferable, and in view of the productivity of the printed material, a resin substrate that can form a roll by winding the sheet-shaped resin substrate is more preferable.

[Ink Applying Step]

In the ink applying step, the ink according to the present disclosure is applied to the recording medium by the ink jet method. In the present step, it is possible to selectively apply the ink composition onto the recording medium and can form a desired visible image. The details of the ink composition such as the details and the preferable aspects of the ink composition are as described in the description of the ink composition.

In the image formation by the ink jet method, energy is supplied and the aforementioned ink composition onto a desired recording medium is jetted to form an image. As the ink jet method preferably used in the present disclosure, a method described in paragraphs 0093 to 0105 of JP2003-306623A can be applied.

The ink jet method is not particularly limited, and for example, the well-known method may be any one of an electric charge control method of jetting ink using electrostatic attraction force, a drop-on-demand method (pressure pulse method) using vibration pressure of a piezoelectric element, an acoustic ink jet method of converting an electric signal into an acoustic beam, irradiating the ink with the acoustic beam, and jetting the ink by using the radiation pressure, or a thermal ink jet method (BUBBLE JET (registered trademark)) of heating the ink, forming bubbles, and using generated pressure. As the ink jet method, particularly, an ink jet method in which ink subjected to an action of thermal energy causes a sudden volume change by a method described in JP1979-059936A (JP-S54-059936A), and the action force due to this state change jets ink from a nozzle can be effectively used.

The ink jet method includes the ink jet method includes a method of jetting a large amount of low density ink called photo ink in a small volume, a method of improving image quality by using a plurality of kinds of ink having substantially the same hue and having different density, and a method of using colorless and transparent ink.

As the ink jet head, there are a shuttle method in which a short serial head is used and recording is performed while scanning the head in the width direction of the recording medium and a line method in which line heads in which recording elements are arranged corresponding to the entire area of one side of the recording medium are used. In the line method, by scanning the recording medium in a direction intersecting the arrangement direction of the recording elements, an image can be recorded on the entire surface of the recording medium, and thus a transportation system such as a carriage for scanning the short head becomes unnecessary. Since the moving of the carriage and the complicated scanning control of the recording medium become unnecessary, and thus only the recording medium moves, such that the recording speed can be increased as compared with the shuttle method. The image forming method according to the present disclosure can be applied to any one of these, but generally, in a case of being applied to a line method in which a dummy jet is not performed, the jetting accuracy and the rub resistance of the image are greatly improved.

In view of obtaining a high definition image, an amount of jetting the ink jetted from the ink jet head is preferably 1 µl to 10 µl (picoliters) and more preferably 1.5 µl to 6 µl. In view of improving the unevenness of the image and the connection of the continuous gradation, it is also effective to jet by combining different jetting amounts, and even in such a case, it can be suitably used for the image forming method according to the present disclosure.

<Ink Drying Step>

If necessary, in the image forming method according to the present disclosure, the ink drying step may be included. The ink drying step is not particularly limited, as long as at least a portion of water of the organic solvent such as the organic solvent d-1 can be removed, and generally used methods can be applied.

<Thermal Fixing Step>

After the ink applying step, the image forming method according to the present disclosure a thermal fixing step may be included. By the thermal fixing step, the image on the recording medium is fixed, and the rub resistance of the image can be further improved.

As the thermal fixing step, for example, a thermal fixing step disclosed in paragraphs 0112 to 0120 of JP2010-221415A can be employed.

EXAMPLES

Hereinafter, the embodiment of the present invention will be described in more detail with reference to examples, but the present disclosure is not limited thereto.

In the following examples, resin particles C-1 to C-20 are the same as the compounds C-1 to C-20 described as specific examples of the aforementioned resin particles.

(Preparing of Resin Particle)

<Preparation of Resin Particle C-1>

Water (250 g), 12-methacrylamidododecanoic acid (7.0 g), potassium hydrogencarbonate (0.17 g), and isopropanol (20 g) were introduced to a three-neck flask equipped with a stirrer, a thermometer, a reflux cooling pipe, and a nitrogen gas inlet tube, and the temperature was raised to 85° C. under a nitrogen stream. Here, a mixed solution including V-501 (radical polymerization initiator, manufactured by Wako Pure Chemical Industries, Ltd.) (0.11 g), potassium hydrogencarbonate (0.08 g), and water (9 g) was added thereto and stirred for 10 minutes. Subsequently, a monomer solution including styrene (30 g) and methyl methacrylate (63 g) was added dropwise to the aforementioned three-neck flask at a constant rate such that the dropwise addition was completed in 3 hours, and further a mixed solution including V-501 (0.06 g), potassium hydrogencarbonate (0.04 g), and water (6 g) was added in two portions immediately after the monomer solution was added dropwise and 1.5 hours after the monomer solution was added dropwise. After the dropwise addition of the monomer solution was completed, the solution was stirred for one hour. Subsequently, a mixed solution including V-501 (0.06 g), potassium hydrogencarbonate (0.04 g), and water (6 g) was added to the obtained reaction mixture, and the mixture was further stirred for three hours. The obtained reaction mixture was filtered through a mesh having a mesh size of 50 µm so as to obtain an aqueous dispersion of a resin particle C-1. The aqueous dispersion of the obtained resin particle C-1 had a pH of 8.5, a concentration of a solid content of 25 mass %, a volume average particle diameter of 30 nm (the volume average particle diameter was measured with Microtrac UPA EX-150 (manufactured by Nikkiso Co., Ltd.)), and a weight-average molecular weight (Mw) of 250,000, and a Tg of 96° C.

The concentration of solid contents means the total amount of other components excluding the solvent in the aqueous dispersion.

<Preparation of Resin Particles C-2 to C-20>

In the preparation of the resin particle C-1, resin particles C-2 to C-20 and Comparisons C-1 to C-3 were prepared by the same method as the resin particle C-1, except that kinds and amounts of the used monomer are changed to the kinds and the amounts of the monomer constituting each monomer unit described above or presented in Table 4.

position was prepared by mixing 2,2-azobis (2-methylbutyronitrile) (22.05 parts) and isopropanol (187.5 parts).

Next, isopropanol (187.5 parts) was heated to 80° C. in a nitrogen atmosphere, and a mixture of the monomer feed composition and the initiator feed composition was added dropwise thereto over two hours. After completion of the dropwise addition, the obtained solution was kept at 80° C. for four hours and then cooled to 25° C.

After cooling, the solvent was removed under reduced pressure to obtain a water-soluble polymer dispersant Q-1 having a weight-average molecular weight of about 30,000 and an acid value of 112 mgKOH/g.

—Preparation of Black Pigment Dispersion—

0.8 equivalent of the amount of methacrylic acid in the water soluble polymer dispersant Q-1 (150 parts) obtained

TABLE 4

| | Monomer unit c-1 | Monomer unit c-2 | Monomer unit c-3 | Mw (ten thousand) | Tg (° C.) |
|---|---|---|---|---|---|
| Comparison C-1 | poly(ethylene glycol) methacrylate sulfate (n = 15), 7 mass % | styrene, 30 mass % | methyl acrylate, 63 mass % | 28 | 89 |
| Comparison C-2 | 4-styrenesulfonic acid, 7 mass % | styrene, 30 mass % | methyl acrylate, 63 mass % | 26 | 103 |
| Comparison C-3 | methacrylic acid, 7 mass % | styrene, 30 mass % | methyl acrylate, 63 mass % | 18 | 110 |
| Comparison C-4 | N-acryloyl oligoglycine (n = 10), 25 mass % | styrene, 30 mass % | methyl acrylate, 45 mass % | 30 | 79 |

(Preparation of Ink)

<Preparation of Pigment Dispersion Liquid>

—Synthesis of Water Soluble Polymer Dispersant Q-1—

A monomer feed composition was prepared by mixing methacrylic acid (172 parts), benzyl methacrylate (828 parts), and isopropanol (375 parts). An initiator feed comas described above was neutralized with an potassium hydroxide aqueous solution and then further adjusted by adding ion exchange water such that the concentration of the water soluble polymer dispersant becomes 25 mass % to obtain a water soluble polymer dispersant aqueous solution.

This water soluble polymer dispersant aqueous solution (124 parts), carbon black MA-100 (black pigment) (48 parts), water (75 parts), and dipropylene glycol (30 parts) were mixed and dispersed in a beads mill (bead diameter: 0.1 mmϕ, zirconia beads) until a desired volume average particle diameter was obtained to obtain a dispersion (uncrosslinked dispersion) of the polymer-coated black pigment particles having a pigment concentration of 15%.

To this uncrosslinked dispersion (136 parts), Denacol EX-321 (crosslinking agent manufactured by Nagase ChemteX Corporation) (1.3 parts) and a boric acid aqueous solution (boric acid concentration: 4 mass %) (14.3 parts) were added, reacted at 50° C. for six hours and half, and then cooled to 25° C. to obtain a crosslinked dispersion. Next, ion exchange water was added to the obtained crosslinked dispersion, and ultrafiltration was performed with an agitation-type ultra holder (manufactured by ADVANTEC) and an ultrafiltration filter (manufactured by ADVANTEC, cut-off molecular weight: 50,000, Q0500076E Ultrafilter). After purification was performed such that the concentration of the dipropylene glycol in the crosslinked dispersion becomes 0.1 mass % or less, concentration was performed until the concentration of the pigment became 15 mass %, so as to obtain a black pigment dispersion. The pigment contained in the black pigment dispersion is a polymer coated pigment (encapsulated pigment) in which the surface thereof is coated with a crosslinked polymer in which the water soluble polymer dispersant Q-1 was crosslinked with a crosslinking agent.

<Preparation of Ink 1>

Respective components were mixed so as to have the following composition, and thus the ink was prepared. After the preparation, coarse particles were removed with a 1 m filter to prepare the ink 1.

[Composition]

Black pigment dispersion liquid: an amount such that the concentration of the pigment became 4 parts by mass Organic solvent d-1: Diethylene glycol monohexyl ether (manufactured by Wako Pure Chemical Industries, Ltd.): 3 parts by mass Organic solvent d-2: Diethylene glycol (manufactured by Wako Pure Chemical Industries, Ltd.): 15 parts by mass Resin particle dispersion of the resin particle C-1 (concentration of solid content: 25 mass %): 20 parts by mass Surfactant CapstoneFS-3100 (manufactured by DuPont): 0.1 parts by mass Water: balance Total: 100 parts by mass <Preparation of Ink 2 to 53>

Ink 2 to 53 were prepared in the same manner as in the preparation of the ink 1, except that the organic solvent d-1, the organic solvent d-2, and kinds and amounts of the resin particles used were changed as presented in Table 5 or 6.

(Image Formation)

The ink 1 to 53 prepared by the aforementioned method with the coated paper (trade name "OK top coat+", manufactured by Oji Paper Co., Ltd.) as the substrate was jetted by a single pass method under the following conditions to form an image.

In each examples and comparative examples, the inks used were as presented in Table 5 or 6.

<Condition>

Head: 1,200 dpi (dot per inch, 1 inch=2.54 cm)/20 inch width piezo full line head Jetting amount: 2.4 pL Driving frequency: 30 kHz (substrate transportation speed: 635 mm/sec)

(Evaluation)

<Evaluation of Jettability>

After one solid image having a recording duty of 100% was formed, the print head was stopped for 30 minutes under conditions of 25° C. and relative humidity of 50%, and the print head was exposed to the atmosphere. After stopping for 30 minutes, one nozzle check pattern of the ink jet recording device was formed. The recorded nozzle check pattern was visually observed and jettability of the ink was evaluated according to the following standard. Evaluation results are presented in Table 5 or 6.

The recording duty of 100% is defined as an image recorded under a condition of applying one drop of approximately 2.4 pL of ink to a unit area (one pixel) of $\frac{1}{1200}$ inches×$\frac{1}{1200}$ inches with a resolution of 1200 dpi×1200 dpi.

[Evaluation Standard]

Evaluation was made by the number of jetting failure nozzles (unit: nozzles). In a case where the number of jetting failure nozzles is 5 or less, the number is within an allowable range for practical use.

AA: No jetting failure nozzles

A: One to two jetting failure nozzles

B: Three to five jetting failure nozzles

C: Six or more jetting failure nozzles

<Evaluation of Drying Properties>

One solid image having a recording duty of 100% was formed. The obtained printed matter was rubbed with a hand at 10 seconds, 20 seconds, and 30 seconds under the condition of 25° C. and 50% relative humidity, and the fast drying fixing properties were confirmed and used as an index of drying properties. Evaluation results are presented in Table 5 or 6.

[Evaluation Standard]

AA: Even in a case where a solid printed portion was touched 10 seconds after printing, the printed surface was not peeled off.

A: In a case where a solid printed portion was touched 10 seconds after printing, the printed surface was peeled off, but in a case where a solid printed portion was touched 20 seconds after printing, the printed surface was not peeled off.

B: In a case where a solid printed portion was touched 20 seconds after printing, the printed surface was peeled off, but in a case where a solid printed portion was touched 30 seconds after printing, the printed surface was not peeled off.

C: In a case where a solid printed portion was touched 30 seconds after printing, the printed surface was peeled off.

<Evaluation of Rub Resistance>

After a solid image having a recording duty of 100% was formed on the recording medium, the solid image was left for 24 hours in an environment of 25° C. and 50% relative humidity. The image forming surface of the recording medium was scratched 50 times with a cleaning paper loaded with a load of $2 \times 10^4$ N/m$^2$. Then, the surface condition of the image forming portion (solid image) was visually confirmed, and the rub resistance of the image was evaluated according to the following evaluation standard. Evaluation results are presented in Table 5 or 6.

[Evaluation Standard]

A: There was no rubbing mark on the image.

B: There was a slight rubbing mark on the image.

C: There was a rubbing mark on the image, and a white background of the recording medium was visible.

<Evaluation of Image Quality>

One image having a recording duty of 80% was recorded, and the graininess of the image of the obtained printed material was visually confirmed and evaluated according to the following evaluation standard to obtain an index of the image quality. Evaluation results are presented in Table 5 or 6.

A: There was no graininess.
B: Slight graininess was recognized.
C: Noticeable graininess was recognized.

<Evaluation of Ink Preservation Stability>

Each ink was filled in an airtight container made of TEFLON (registered trademark) and stored for four weeks in a thermostatic chamber at 60° C. to perform a storage test. The viscosity of the ink before and after the storage test was measured, and the change rate of the viscosity of the ink was calculated from the following expression. The viscosity of the ink was measured at a temperature of 30° C. with VISCOMETER TV-22 (manufactured by TOKI SANGYO CO. LTD.).

Using the measurement results, the preservation stability of the ink was evaluated according to the criteria shown below. The change rate of the viscosity of the ink which is closer to 1.0 means that the preservation stability of the ink is higher. Evaluation results are presented in Table 5 or 6.

Viscosity change rate=(viscosity of ink after storage test)/(viscosity of ink before storage test)

A: A viscosity change rate was less than 1.1.
B: A viscosity change rate was 1.1 or more and less than 1.2.
C: A viscosity change rate was 1.2 or more.

TABLE 5

| | | Resin particle | | | | Organic solvent | | |
| | | Monomer unit c-1 | | | Monomer unit c-2 | Organic solvent d-1 | | |
| | Ink | Kind | Content (mass %) | ClogP | Content (mass %) | Content (mass %) | Kind | ClogP | Content (mass %) |
|---|---|---|---|---|---|---|---|---|---|
| Example 1 | Ink 1 | C-1 | 5 | 3.63 | 7 | 30 | DEGmHE | 1.76 | 3 |
| Example 2 | Ink 2 | C-1 | 5 | 3.63 | 7 | 30 | DEGmHE | 1.76 | 3 |
| Example 3 | Ink 3 | C-1 | 5 | 3.63 | 7 | 30 | EGmHE | 1.90 | 3 |
| Example 4 | Ink 4 | C-1 | 5 | 3.63 | 7 | 30 | DEGmEHE | 2.69 | 3 |
| Example 5 | Ink 5 | C-1 | 5 | 3.63 | 7 | 30 | DEGmBE | 0.71 | 3 |
| Comparative Example 1 | Ink 6 | C-1 | 5 | 3.63 | 7 | 30 | DEGmEE | −0.35 | 3 |
| Example 6 | Ink 7 | C-1 | 5 | 3.63 | 7 | 30 | 1,2-Octanediol | 1.58 | 3 |
| Example 7 | Ink 8 | C-1 | 5 | 3.63 | 7 | 30 | 1,2-Hexanediol | 0.53 | 3 |
| Comparative Example 2 | Ink 9 | C-1 | 5 | 3.63 | 7 | 30 | 1,2-Butanediol | −0.53 | 3 |
| Comparative Example 3 | Ink 10 | C-1 | 5 | 3.63 | 7 | 30 | 2-Ethyl-1,3-hexanediol | 1.26 | 3 |
| Example 8 | Ink 11 | C-1 | 5 | 3.63 | 7 | 30 | DEGmHE | 1.76 | 5 |
| Example 9 | Ink 12 | C-1 | 5 | 3.63 | 7 | 30 | DEGmHE | 1.76 | 10 |
| Comparative Example 4 | Ink 13 | C-1 | 5 | 3.63 | 7 | 30 | DEGmHE | 1.76 | 15 |
| Example 10 | Ink 14 | C-1 | 5 | 3.63 | 7 | 30 | DEGmHE | 1.76 | 1 |
| Example 11 | Ink 15 | C-1 | 5 | 3.63 | 7 | 30 | DEGmHE | 1.76 | 0.5 |
| Comparative Example 5 | Ink 16 | C-1 | 5 | 3.63 | 7 | 30 | — | — | — |
| Example 12 | Ink 17 | C-1 | 5 | 3.63 | 7 | 30 | DEGmHE | 1.76 | 3 |
| Example 13 | Ink 18 | C-1 | 5 | 3.63 | 7 | 30 | DEGmHE | 1.76 | 3 |
| Example 14 | Ink 19 | C-1 | 5 | 3.63 | 7 | 30 | DEGmHE | 1.76 | 3 |
| Example 15 | Ink 20 | C-2 | 5 | 4.57 | 7 | 30 | DEGmHE | 1.76 | 3 |
| Example 16 | Ink 21 | C-3 | 5 | 5.76 | 7 | 30 | DEGmHE | 1.76 | 3 |
| Example 17 | Ink 22 | C-4 | 5 | 2.02 | 7 | 30 | DEGmHE | 1.76 | 3 |
| Comparative Example 6 | Ink 23 | Comparison C-1 | 5 | −0.84 | 7 | 30 | DEGmHE | 1.76 | 3 |
| Comparative Example 7 | Ink 24 | Comparison C-2 | 5 | 0.38 | 7 | 30 | DEGmHE | 1.76 | 3 |
| Comparative Example 8 | Ink 25 | Comparison C-3 | 5 | 0.64 | 7 | 30 | DEGmHE | 1.76 | 3 |
| Example 18 | Ink 26 | C-5 | 5 | 3.63 | 1 | 30 | DEGmHE | 1.76 | 3 |
| Example 19 | Ink 27 | C-6 | 5 | 3.63 | 3 | 30 | DEGmHE | 1.76 | 3 |
| Example 20 | Ink 28 | C-7 | 5 | 3.63 | 10 | 30 | DEGmHE | 1.76 | 3 |

| | Organic solvent Organic solvent d-2 | | | Evaluation result | | | | |
| | Kind | Vapor pressure (Pa) | Content (mass %) | Jettability | Image quality | Preservation stability | Drying properties | Rub resistance |
|---|---|---|---|---|---|---|---|---|
| Example 1 | DEG | 2.7 | 15 | AA | A | A | A | A |
| Example 2 | PG | 10.6 | 15 | AA | A | A | AA | A |
| Example 3 | DEG | 2.7 | 15 | AA | A | A | A | A |
| Example 4 | DEG | 2.7 | 15 | AA | A | A | A | A |
| Example 5 | DEG | 2.7 | 15 | AA | B | A | A | A |
| Comparative Example 1 | DEG | 2.7 | 15 | AA | C | A | A | B |
| Example 6 | DEG | 2.7 | 15 | AA | A | A | A | A |

TABLE 5-continued

| | | | | | | | | |
|---|---|---|---|---|---|---|---|---|
| Example 7 | DEG | 2.7 | 15 | AA | B | A | A | A |
| Comparative Example 2 | DEG | 2.7 | 15 | AA | C | A | A | B |
| Comparative Example 3 | DEG | 2.7 | 15 | AA | C | A | A | B |
| Example 8 | DEG | 2.7 | 15 | AA | A | A | A | A |
| Example 9 | DEG | 2.7 | 15 | AA | A | B | A | A |
| Comparative Example 4 | DEG | 2.7 | 15 | AA | A | C | A | A |
| Example 10 | DEG | 2.7 | 15 | AA | A | A | A | A |
| Example 11 | DEG | 2.7 | 15 | AA | B | A | A | A |
| Comparative Example 5 | DEG | 2.7 | 15 | AA | C | A | A | B |
| Example 12 | DEG | 2.7 | 25 | AA | A | A | A | A |
| Example 13 | DEG | 2.7 | 35 | AA | A | A | B | A |
| Example 14 | DEG | 2.7 | 5 | B | A | A | A | A |
| Example 15 | DEG | 2.7 | 15 | AA | A | A | A | A |
| Example 16 | DEG | 2.7 | 15 | A | A | A | A | A |
| Example 17 | DEG | 2.7 | 15 | B | A | A | A | A |
| Comparative Example 6 | DEG | 2.7 | 15 | C | A | C | A | A |
| Comparative Example 7 | DEG | 2.7 | 15 | C | A | C | A | A |
| Comparative Example 8 | DEG | 2.7 | 15 | C | A | B | A | A |
| Example 18 | DEG | 2.7 | 15 | B | A | A | A | A |
| Example 19 | DEG | 2.7 | 15 | AA | A | A | A | A |
| Example 20 | DEG | 2.7 | 15 | AA | A | A | A | A |

TABLE 6

| | | Resin particle | | | | | Organic solvent | | |
|---|---|---|---|---|---|---|---|---|---|
| | | Monomer unit c-1 | | | Monomer unit c-2 | | Organic solvent d-1 | | |
| | Ink | Kind | Content (mass %) | ClogP | Content (mass %) | Content (mass %) | Kind | ClogP | Content (mass %) |
| Example 21 | Ink 29 | C-8 | 5 | 3.63 | 15 | 30 | DEGmHE | 1.76 | 3 |
| Example 22 | Ink 30 | C-9 | 5 | 3.63 | 20 | 30 | DEGmHE | 1.76 | 3 |
| Comparative Example 9 | Ink 31 | Comparison C-4 | 5 | 3.63 | 25 | 30 | DEGmHE | 1.76 | 3 |
| Example 23 | Ink 32 | C-10 | 5 | 3.63 | 7 | 30 | DEGmHE | 1.76 | 3 |
| Example 24 | Ink 33 | C-11 | 5 | 3.63 | 7 | 30 | DEGmHE | 1.76 | 3 |
| Example 25 | Ink 34 | C-12 | 5 | 3.63 | 7 | 30 | DEGmHE | 1.76 | 3 |
| Example 26 | Ink 35 | C-13 | 5 | 3.63 | 7 | 30 | DEGmHE | 1.76 | 3 |
| Example 27 | Ink 36 | C-14 | 5 | 3.63 | 7 | 5 | DEGmHE | 1.76 | 3 |
| Example 28 | Ink 37 | C-15 | 5 | 3.63 | 7 | 10 | DEGmHE | 1.76 | 3 |
| Example 29 | Ink 38 | C-16 | 5 | 3.63 | 7 | 50 | DEGmHE | 1.76 | 3 |
| Example 30 | Ink 39 | C-17 | 5 | 3.63 | 7 | 90 | DEGmHE | 1.76 | 3 |
| Example 31 | Ink 40 | C-18 | 5 | 3.63 | 7 | 30 | DEGmHE | 1.76 | 3 |
| Example 32 | Ink 41 | C-19 | 5 | 3.63 | 7 | 46 | DEGmHE | 1.76 | 3 |
| Example 33 | Ink 42 | C-20 | 5 | 3.63 | 7 | 63 | DEGmHE | 1.76 | 3 |
| Example 34 | Ink 43 | C-21 | 5 | 3.63 | 7 | 30 | DEGmHE | 1.76 | 3 |
| Example 35 | Ink 44 | C-22 | 5 | 3.63 | 15 | 85 | DEGmHE | 1.76 | 3 |
| Example 36 | Ink 45 | C-1 | 10 | 3.63 | 7 | 30 | DEGmHE | 1.76 | 3 |
| Example 37 | Ink 46 | C-1 | 15 | 3.63 | 7 | 30 | DEGmHE | 1.76 | 3 |
| Example 38 | Ink 47 | C-1 | 3 | 3.63 | 7 | 30 | DEGmHE | 1.76 | 3 |
| Example 39 | Ink 48 | C-1 | 1 | 3.63 | 7 | 30 | DEGmHE | 1.76 | 3 |
| Example 40 | Ink 49 | C-1 | 5 | 3.63 | 7 | 30 | TEGmHE | 1.63 | 3 |
| Example 41 | Ink 50 | C-1 | 5 | 3.63 | 7 | 30 | PGmHE | 2.21 | 3 |
| Example 42 | Ink 51 | C-1 | 5 | 3.63 | 7 | 30 | DPGmHE | 2.34 | 3 |
| Example 43 | Ink 52 | C-1 | 5 | 3.63 | 7 | 30 | Phenoxyethanol | 1.19 | 3 |
| Example 44 | Ink 53 | C-1 | 5 | 3.63 | 7 | 30 | DEGmHE | 1.76 | 3 |

| | Organic solvent Organic solvent d-2 | | Evaluation result | | | | |
|---|---|---|---|---|---|---|---|
| | Kind | Vapor pressure (Pa) | Content (mass %) | Jettability | Image quality | Preservation stability | Drying properties | Rub resistance |
| Example 21 | DEG | 2.7 | 15 | A | A | A | A | A |
| Example 22 | DEG | 2.7 | 15 | B | A | A | A | A |
| Comparative Example 9 | DEG | 2.7 | 15 | C | A | A | A | A |

TABLE 6-continued

| Example | Solvent | | | | | | | |
|---|---|---|---|---|---|---|---|---|
| Example 23 | DEG | 2.7 | 15 | B | A | A | A | A |
| Example 24 | DEG | 2.7 | 15 | B | A | A | A | A |
| Example 25 | DEG | 2.7 | 15 | B | A | A | A | A |
| Example 26 | DEG | 2.7 | 15 | B | A | A | A | A |
| Example 27 | DEG | 2.7 | 15 | B | A | A | A | A |
| Example 28 | DEG | 2.7 | 15 | AA | A | A | A | A |
| Example 29 | DEG | 2.7 | 15 | AA | A | A | A | A |
| Example 30 | DEG | 2.7 | 15 | AA | A | A | A | B |
| Example 31 | DEG | 2.7 | 15 | AA | A | A | A | B |
| Example 32 | DEG | 2.7 | 15 | AA | A | A | A | B |
| Example 33 | DEG | 2.7 | 15 | AA | A | A | A | A |
| Example 34 | DEG | 2.7 | 15 | AA | A | A | A | B |
| Example 35 | DEG | 2.7 | 15 | AA | A | A | A | A |
| Example 36 | DEG | 2.7 | 15 | AA | A | A | A | A |
| Example 37 | DEG | 2.7 | 15 | AA | A | B | A | A |
| Example 38 | DEG | 2.7 | 15 | AA | A | A | A | A |
| Example 39 | DEG | 2.7 | 15 | AA | A | A | A | B |
| Example 40 | DEG | 2.7 | 15 | AA | A | A | A | A |
| Example 41 | DEG | 2.7 | 15 | AA | A | A | A | A |
| Example 42 | DEG | 2.7 | 15 | AA | A | A | A | A |
| Example 43 | DEG | 2.7 | 15 | AA | B | A | A | A |
| Example 44 | Glycerin | 0.01 | 15 | AA | A | A | B | A |

In Table 5 or 6, details of the abbreviations are as follows.
DEGmHE: Diethylene glycol monohexyl ether
EGmHE: Ethylene glycol monohexyl ether
DEGmEHE: Diethylene glycol mono-2-ethyl hexyl ether
DEGmBE: Diethylene glycol monobutyl ether
DEGmEE: Diethylene glycol monoethyl ether
DEG: Diethylene glycol
PG: propylene glycol
TEGmHE: Triethylene glycol monohexyl ether
PGmHE: Propylene glycol monohexyl ether
DPGmHE: Dipropylene glycol monohexyl ether As presented in Table 5 or 6, in Examples 1 to 37 in which the ink jet recording aqueous ink composition which includes a coloring material, water, the organic solvent d-1, and resin particles, and in which the content of the organic solvent d-1 is 0.5 mass % to 10 mass % with respect to the total mass of the ink jet recording aqueous ink composition is used, the jettability and the preservation stability of the ink and the image quality of the obtained image were excellent, and further the drying properties of the ink and the rub resistance of the obtained image were also excellent.

In Example 2 and 8 to 39, even in a case where DEGmHE which was used as the organic solvent d-1 was changed to EGmHE, with respect to all evaluation standards, it was possible to obtain the same results as the evaluation results in Example 2 and 8 to 39.

For example, from the results of Examples 1 to 5, it is understood that in a case where the number of carbon atoms of $R^2$ in Formula 1 was more than 4, the image quality is further improved.

For example, from the results of Examples 6 and 7, it is understood that in a case where the number of carbon atoms of $R^2$ in Formula 2 was more than 6, the image quality is further improved.

For example, from the results of Examples 1, 8, and 9, it is understood that in a case where the content of the organic solvent d-1 was less than 10 mass %, the preservation stability is further improved.

For example, from the results of Examples 1 and 10 and 11, it is understood that in a case where the content of the organic solvent d-1 was more than 0.5 mass %, the image quality was further improved.

For example, from the results of Examples 1 and 12 to 14, it is understood that in a case where the content of the organic solvent d-2 was more than 5 mass %, the jettability was further improved, and in a case where the content thereof was less than 35 mass %, the drying properties were further improved.

For example, from the results of Examples 1 and 15 to 17, it is understood that, in a case where the monomer unit c-1 is a monomer unit represented by Formula 4, the jettability was further improved.

For example, from the results of Examples 1 and 15 to 17, it is understood that, in a case where the monomer unit c-1 is a monomer unit represented by Formula 4 or 5, the jettability was further improved, and in a case where the monomer unit c-1 is a monomer unit represented by Formula 4, the jettability was even further improved.

For example, from the results of Examples 1 and 18 to 22, it is understood that, in a case where the content of the monomer unit c-1 is more than 1 mass % and less than 20 mass %, the jettability was further improved, and the content thereof was 1 mass % and less than 15 mass %, the jettability was even further improved.

For example, from the results of Examples 1 and 23 to 26, it is understood that, in a case where the monomer unit c-2 was a monomer unit represented by Formula A, the jettability was improved.

For example, from the results of Examples 1 and 27 to 30, it is understood that, in a case where the content of the monomer unit c-2 was more than 5 mass % and less than 90 mass %, the jettability and the rub resistance were further improved.

For example, from the results of Examples 1 and 31 to 35, it is understood that the evaluation results are the same also for the resin particles having different structures of the monomer unit c-3 and the resin particle not containing the monomer unit c-3.

For example, from the results of Examples 36 to 39, it is understood that in a case where the content of the resin particles was more than 1 mass % and less than 15 mass %, the preservation stability and the rub resistance are further improved.

For example, from the results of Examples 40 to 42, it is understood that, even in a case where n is 3 in Formula 1 or in a case where $R^1$ was a methyl group, the effect of ink according to the present disclosure can be obtained.

For example, from the results of Example 43, it is understood that, even in the case where $R^1$ described in Formula 1 is an aryl group having 6 to 10 carbon atoms, the effect of the ink according to the present disclosure can be obtained.

For example, from the results of Examples 1 and 44, it is understood that, in a case where a compound having a vapor pressure of 1 Pa or more is used as the organic solvent d-2, the drying properties of the ink is more excellent.

What is claimed is:

1. An ink jet recording aqueous ink composition comprising:
   a coloring material;
   water;
   an organic solvent d-1 which is represented by Formula 1 or 2 and which has a C log P value of 0.5 to 3.5; and
   a resin particle including a resin containing 1 mass % to 20 mass % of a monomer unit c-1, which is represented by Formula 3, having a C log P value more than the C log P value of the organic solvent d-1 and having an anionic group, with respect to a total mass of the resin,
   wherein a content of the organic solvent d-1 is 0.5 mass % to 10 mass % with respect to a total mass of the ink jet recording aqueous ink composition,

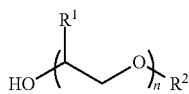

Formula 1

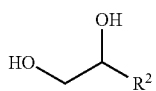

Formula 2 in Formula 1 or 2, $R^1$'s each independently represent a hydrogen atom or a methyl group, $R^2$ represents a linear or branched hydrocarbon group having 4 to 9 carbon atoms or an aryl group having 6 to 10 carbon atoms, and n represents an integer of 1 to 3,

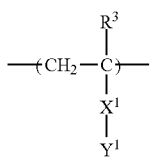

Formula 3 in Formula 3, $R^3$ represents a hydrogen atom or an alkyl group having 1 to 4 carbon atoms, $X^1$ represents a divalent linking group, $Y^1$ represents an anionic group, and in $X^1$ and $Y^1$, an atom farthest from a main chain is disposed 9 atoms to 27 atoms away from the main chain.

2. The ink jet recording aqueous ink composition according to claim 1,
   wherein the monomer unit c-1 is a monomer unit represented by Formula 4 or 5,

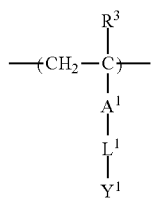

Formula 4

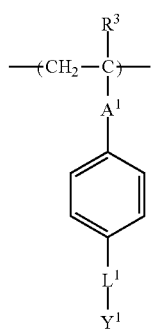

Formula 5 in Formula 4 or 5, $R^3$ represents a hydrogen atom or an alkyl group having 1 to 4 carbon atoms, $A^1$ represents a single bond, —C(=O)O—, or —C(=O)NR$^4$—, $R^4$ represents a hydrogen atom or an alkyl group having 1 to 4 carbon atoms, $L^1$ represents a divalent linking group having 6 to 22 carbon atoms, $Y^1$ represents an anionic group, and in $L^1$ and $Y^1$, an atom farthest from a main chain is disposed 9 atoms to 27 atoms away from the main chain.

3. The ink jet recording aqueous ink composition according to claim 2,
   wherein $Y^1$ in Formula 4 or 5 is —C(=O)OM, —S(=O)$_2$OM, or —OP(=O)(OM)$_2$, and M is a proton, an alkali metal ion, or an ammonium ion.

4. The ink jet recording aqueous ink composition according to claim 2,
   wherein $Y^1$ in Formula 4 or 5 is —C(=O)OM, and M is a proton, an alkali metal ion, or an ammonium ion.

5. The ink jet recording aqueous ink composition according to claim 2,
   wherein the monomer unit c-1 is a monomer unit represented by Formula 4.

6. The ink jet recording aqueous ink composition according to claim 1,
   wherein the resin further contains a monomer unit c-2 derived from an ethylenically unsaturated compound having an aromatic ring structure or an alicyclic structure.

7. The ink jet recording aqueous ink composition according to claim 6,
   wherein the monomer unit c-2 includes a monomer unit represented by any one of Formulae A to E,

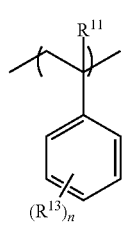

Formula A

-continued

Formula B
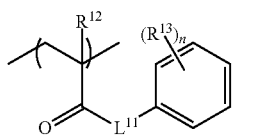

Formula C
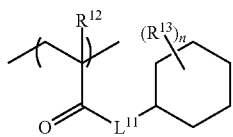

Formula D
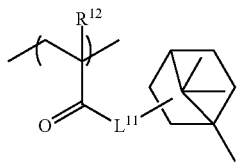

Formula E
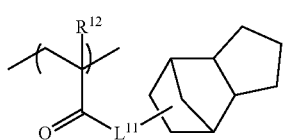

in Formulae A to E, $R^{11}$ and $R^{12}$ each independently represent a methyl group or a hydrogen atom, $R^{13}$'s each independently represent a linear or branched alkyl group having 1 to 10 carbon atoms, n is an integer of 0 to 5, and $L^{11}$ represents a single bond, or a linear or branched alkylene group having 1 to 18 carbon atoms which may have a ring structure, an arylene group having 6 to 18 carbon atoms, —O—, —NH—, —S—, —C(=O)—, or a divalent linking group formed by linking two or more thereof.

8. The ink jet recording aqueous ink composition according to claim 7,
wherein the monomer unit c-2 includes a monomer unit represented by Formula A, and a content of the monomer unit represented by Formula A is 5 mass % to 90 mass % with respect to a total mass of the resin.

9. The ink jet recording aqueous ink composition according to claim 7,
wherein the monomer unit c-2 includes a monomer unit represented by Formula A, and a content of the monomer unit represented by Formula A is 10 mass % to 50 mass % with respect to a total mass of the resin.

10. The ink jet recording aqueous ink composition according to claim 1,
wherein a content of the resin particle is 1 mass % to 10 mass % with respect to the total mass of the ink jet recording aqueous ink composition.

11. The ink jet recording aqueous ink composition according to claim 1,
wherein the C log P value of the organic solvent d-1 is 1.5 to 3.0.

12. The ink jet recording aqueous ink composition according to claim 1,
wherein a content of the organic solvent d-1 is 1.0 mass % to 5.0 mass % with respect to the total mass of the ink jet recording aqueous ink composition.

13. The ink jet recording aqueous ink composition according to claim 1, further comprising:
an organic solvent d-2 which is an organic solvent other than the organic solvent d-1 and which has a vapor pressure at 20° C. of 1.0 Pa or more.

14. The ink jet recording aqueous ink composition according to claim 13,
wherein a total content of the organic solvent d-1 and the organic solvent d-2 is 10 mass % to 30 mass % with respect to the total mass of the ink jet recording aqueous ink composition, a content mass ratio between the organic solvent d-1 and the organic solvent d-2 (organic solvent d-1:organic solvent d-2) is 1:1 to 1:15.

15. An image forming method comprising:
a step of forming an image by applying the ink jet recording aqueous ink composition according to claim 1 onto a recording medium by an ink jet method.

16. The image forming method according to claim 15,
wherein the step of forming the image is a step of forming an image by directly applying the ink jet recording aqueous ink composition according to claim 1 onto a low water-absorptive recording medium or a non-water-absorptive recording medium.

17. The ink jet recording aqueous ink composition according to claim 1,
wherein the ink jet recording aqueous ink composition further contains a dispersant.

* * * * *